(12) United States Patent
Takino

(10) Patent No.: US 6,624,976 B2
(45) Date of Patent: Sep. 23, 2003

(54) MAGNETIC DISC CARTRIDGE HAVING A SUBSTRATE WITH MAGNETIZED PIT TRAINS AND A SUBSTRATE WITH SAME COEFFICIENT OF THERMAL EXPANSION AS HUB

(75) Inventor: Hiroshi Takino, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/090,502

(22) Filed: Mar. 4, 2002

(65) Prior Publication Data
US 2002/0089786 A1 Jul. 11, 2002

Related U.S. Application Data

(62) Division of application No. 09/029,495, filed on Aug. 7, 1998, now abandoned.

(30) Foreign Application Priority Data

Jun. 26, 1996 (JP) .......................................... P8-165842
Jun. 27, 1996 (JP) .......................................... P8-168019

(51) Int. Cl.⁷ ................................................ G11B 5/82
(52) U.S. Cl. ...................................................... 360/135
(58) Field of Search ................................ 360/133, 135, 360/98.04, 48, 77.08

(56) References Cited

U.S. PATENT DOCUMENTS

| | | | | |
|---|---|---|---|---|
| 4,769,733 A | * | 9/1988 | Freeman et al. | ............ 360/133 |
| 4,864,452 A | * | 9/1989 | Thompson et al. | ......... 360/133 |
| 4,870,518 A | * | 9/1989 | Thompson et al. | ...... 360/97.01 |
| 5,402,278 A | * | 3/1995 | Morita | ....................... 360/135 |
| 5,473,480 A | * | 12/1995 | Ishida | ......................... 360/48 |
| 5,815,333 A | * | 9/1998 | Yamamoto et al. | ......... 360/135 |

FOREIGN PATENT DOCUMENTS

| | | | |
|---|---|---|---|
| EP | 0 657 884 | * | 6/1995 |
| JP | 61-208684 | * | 9/1986 |
| JP | 5274834 | * | 10/1993 |
| JP | 6-36496 | * | 2/1994 |
| JP | 7-153069 | * | 6/1995 |
| JP | 8-185676 | * | 7/1996 |

* cited by examiner

*Primary Examiner*—David Davis
(74) *Attorney, Agent, or Firm*—Sonnenschein, Nath & Rosenthal

(57) ABSTRACT

A magnetic disc rotates causing an air flow that produces a floating force head unit which undergoes floating force by air flow produced as the result of the fact that the magnetic disc is rotated serves to selectively carry out loading of a first disc cartridge within which there is accommodated a first magnetic disc adapted so that flat recording tracks are provided at a disc substrate formed by molding synthetic resin and a magnetic layer is provided in a manner to cover the recording tracks, and a second disc cartridge within which there is accommodated a second magnetic disc adapted so that information uneven pit trains are formed at a disc substrate formed by molding synthetic resin and a magnetic layer is formed in a manner to include bottom surfaces and upper surfaces of information uneven pit trains, the magnetic layer being magnetized in the state where magnetization direction of the magnetic layer portions on the bottom surfaces and that of the magnetic layer portions of the upper surfaces of information pit trains are different from each other so that information such as program, etc. are recorded. Thus, new program can be installed into computer only by exchange of the disc cartridge.

2 Claims, 11 Drawing Sheets

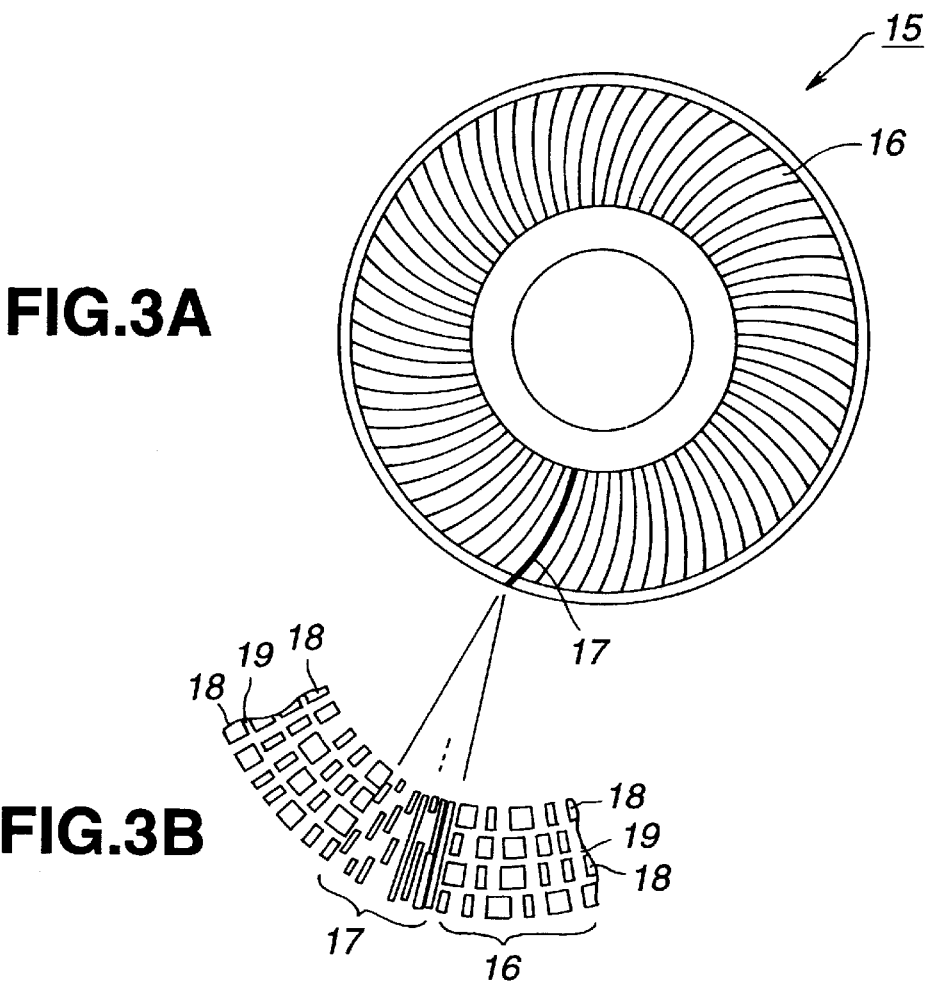
FIG.3A
FIG.3B
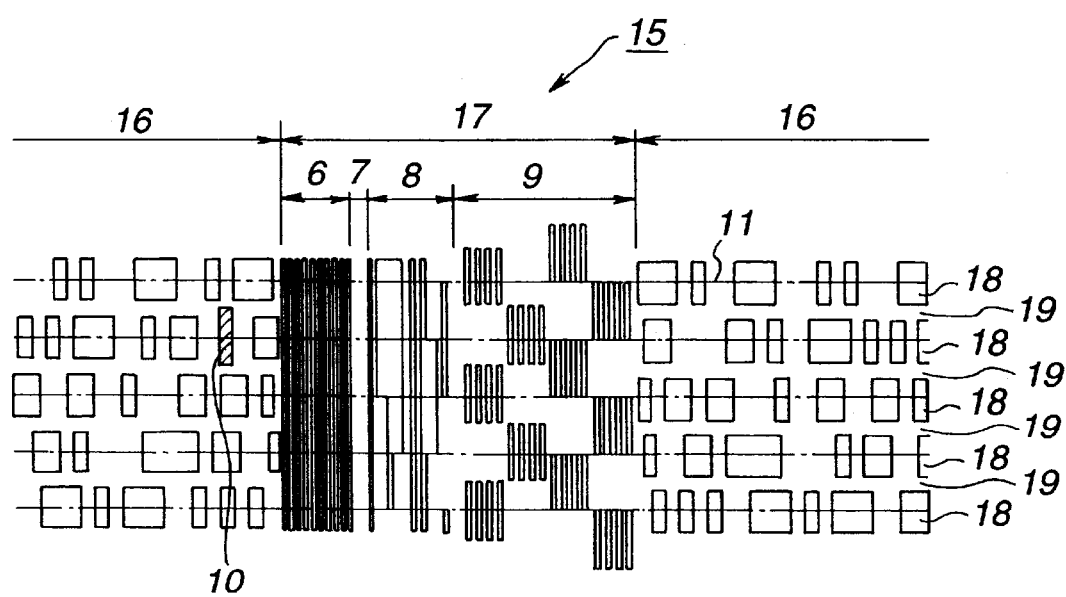
FIG.4

MAGNETIC DISC CARTRIDGE HAVING A SUBSTRATE WITH MAGNETIZED PIT TRAINS AND A SUBSTRATE WITH SAME COEFFICIENT OF THERMAL EXPANSION AS HUB

RELATED APPLICATIONS

This is a division of application Ser. No. 09/029,495, filed on Aug. 7, 1998 ABN.

BACKGROUND OF THE INVENTION

This invention relates to a magnetic disc apparatus using, as a recording medium, a magnetic disc adapted so that a magnetic layer is formed on a disc substrate formed by molding a synthetic resin, and a disc cartridge for loading a magnetic disc into this magnetic disc apparatus. More particularly, this invention relates to a magnetic disc apparatus adapted so that a magnetic disc on which processing information processed by information processing equipment such as computer, etc. are recorded and a magnetic disc on which program information that a computer executes are recorded in advance are selectively loaded, and a disc cartridge within which such a magnetic disc is accommodated.

Hitherto, as a recording device for recording processing information processed by a computer, or for recording program information that a computer executes, there are used disc apparatuses using, as recording media hard discs using metallic disc substrates of steel such as aluminum, etc. Such disc apparatuses are of a structure in which magnetic discs serving as recording media are integrally assembled within the apparatus body along with the magnetic head units. In addition, disc apparatuses of this kind are used in a state integrally assembled within the computer body.

In disc apparatuses adapted so that a magnetic disc is integrally assembled within the apparatus body in this way, since it is impossible to exchange the magnetic disc, when there is necessity of recording new program information onto this magnetic disc, a magnetic disc unit for reproducing the magnetic disc on which such new program information are recorded is required. Magnetic discs such as a floppy disc can be exchangeably loaded with respect to such a magnetic disc unit. Namely, it is necessary to carry out an installation operation which is an operation to read out new program information recorded on the magnetic disc by one magnetic disk unit in which the magnetic disc can be exchangeably loaded to write the new program information thus read out onto the magnetic disc integrally assembled within the other magnetic disc unit. Further, since a magnetic disc such as a floppy disc has a small memory capacity, a large number of magnetic discs are required for recording program information of a large quantity. As a result, not only lengthy operation is required for the installation work, but also the work becomes complicated.

Moreover, in the case of recording processing information processed by a computer with respect to a disc unit adapted so that a magnetic disc is integrally assembled within the unit body, when the memory capacity of the magnetic disc becomes small, it is necessary to erase data recorded on the magnetic disc to ensure memory capacity. In the case of storing data erased from this magnetic disc, it is necessary to prepare another recording unit capable of exchanging a recording medium such as a magnetic disc or magnetic tape, etc. to record data with respect to this recording unit.

In the case where the magnetic disc unit in which the magnetic disc is integrally assembled is used as a recording unit for a computer as stated above, it is necessary to further use another recording unit. As a result, not only can the computer become large-sized, but also the installation operation of new program information and/or recording operation of processing information processed by the computer becomes complicated.

Further, as recording media on which information processed by a computer is recorded or program information that computer executes is recorded, there are used CD-ROMs which are reproduction only type optical discs.

In CD-ROMs, pit trains formed as very small uneven trains on a disc substrate (obtained by molding synthetic resin), are used to record processing information processed by a computer and/or program information that the computer executes. In the case of such CD-ROMs, a stamper, in which pit trains corresponding to the pit trains formed in the disc substrate are formed, is prepared. The stamper is loaded with respect to the metal mold of the molding unit to mold synthetic resin, thereby making it possible to manufacture a large number of the same CD-ROMs.

Since CD-ROMs can carry out high density recording, it is possible to record a large quantity of processing information or a large capacity of program information on a single CD-ROM.

Respective information recorded on the CD-ROM are read out by using an optical disc player provided with an optical pick-up unit. The optical disc player serves to scan the signal recording surface of a CD-ROM, rotationally operated after having undergone loading with respect to the disc rotational operating mechanism, with light beams emitted from a light source of an optical pick-up unit to detect return light beams modulated and reflected by pit trains of the CD-ROM with a light detector provided within the optical pick-up unit to thereby read out respective information.

Meanwhile, since the optical disc player serves to scan, while focusing light beams emitted from the optical pick-up unit onto recording tracks consisting of pit trains formed at the signal recording surface of the CD-ROM, recording tracks with these light beams to carry out read-out operation of information recorded on the CD-ROM, it is difficult to quickly provide access to a recording track at or in which desired information is recorded. Thus, a high speed read-out operation of information cannot be carried out. Moreover, since the optical pick-up unit includes therewithin a light source and a light detector along with an objective lens for focusing light beams on the signal recording surface and an objective lens drive unit for allowing the objective lens to undergo drive displacement, not only is the weight so large that this unit becomes large-sized, but also it becomes difficult to carry out high speed movement of the optical pick-up unit. As a result, it would become difficult to quickly provide access to a recording track at or in which desired information is recorded.

For this reason, in the case where information recorded on the CD-ROM is used in a computer, it is necessary for carrying out a quick read-out operation of information to carry out smooth execution of programs to record such information onto a hard disc adapted so that a quick read-out operation of information can be carried out.

Also, in the case where a CD-ROM capable of carrying out high density recording and having a large recording capacity is used as stated above, it is necessary to carry out recording of information onto the hard disc. As a result, it not only becomes difficult to improve operating ability of the computer, but also it is necessary to use a magnetic disc unit along with the optical disc player, thus making the computer large-sized.

SUMMARY OF THE INVENTION

An object of this invention is to provide a magnetic disc apparatus which can improve the operating ability of a computer provided with a recording unit and to realize miniaturization of the computer.

Another object of this invention is to provide a magnetic disc apparatus which can easily carry out supplementation or exchange of a program executed by the computer.

A further object of this invention is to provide a magnetic disc apparatus which can facilitate recording of processing information processed by a computer and storage of the processing information.

A still further object of this invention is to provide a magnetic disc with increased memory capacity and on which can be easily mass-produced.

A still more further object of this invention is to provide a magnetic disc which can be loaded on a magnetic disc apparatus with high positioning accuracy.

A further different object of this invention is to provide a disc cartridge which can accommodate a magnetic disc whose memory capacity has been increased and which can be selectively loaded with respect to the magnetic disc apparatus.

A still further different object of this invention is to provide a disc cartridge which can easily identify the kind of disc cartridge to be loaded and a magnetic disc apparatus adapted so that such a disc cartridge is loaded.

In an embodiment, the invention provides a magnetic disc apparatus using a magnetic disc adapted so that recording and/or reproduction are carried out by a magnetic head unit which experiences a floating force by air flow produced as the result of the fact that the magnetic disc is rotated. This magnetic disc apparatus is adapted so that there are selectively loaded: (1) first disc cartridge within which there is accommodated a first magnetic disc on which flat recording tracks are provided in a disc substrate formed by molding synthetic resin, and a magnetic layer is provided in a manner to cover the recording tracks, and (2) a second disc cartridge within which there is accommodated a second magnetic disc on which uneven information pit trains are formed in a disc substrate formed by molding synthetic resin, and a magnetic layer is formed in a manner including bottom surfaces and upper surfaces of the information uneven pit trains, the magnetic layer being magnetized in a state where the magnetization directions of the magnetic layer portion of the bottom surface of the information pit train and that of the magnetic layer portion of the upper surface of the information pit train are different from each other so that information such as programs, etc. for controlling computer are recorded.

In an embodiment the second disc cartridge within which there is accommodated the second magnetic disc on which information such as a program, etc. for controlling computer are recorded is loaded, thereby making it possible to install a new program with respect to the computer.

In an embodiment of the magnetic disc apparatus according to this invention further comprises a base adapted so that at least a disc rotational operation mechanism and a magnetic head unit are attached and a cartridge loading portion is provided, and a casing within which the base is accommodated, wherein an insertion/withdrawal hole of the disc cartridge is provided in the casing, and the disc cartridge inserted into the casing through the insertion/withdrawal hole is loaded with respect to the cartridge loading portion.

In an embodiment, this magnetic disc apparatus further comprises, within the casing, a cover opening/closing mechanism for allowing a cover body which opens/closes an opening portion provided in the disc cartridge thereby to undergo opening operation. In addition, in the magnetic disc unit, there is further provided a cartridge discrimination mechanism for discriminating different kinds of disc cartridges loaded with respect to the cartridge loading portion.

In an embodiment, as the second magnetic disc used in the magnetic disc apparatus according to this invention, there is used a disc including a disc substrate adapted so that "information" uneven pit trains in which data are recorded and "control" uneven pit trains where control signals for controlling positioning of the magnetic head unit are recorded, are formed on one surface and flat recording tracks are provided on the other surface, a magnetic layer formed in a manner including bottom surfaces and upper surfaces of the "information" uneven pit trains and the "control" uneven pit trains formed on one surface of the disc substrate, and a magnetic layer formed in a manner to cover recording tracks formed on the other surface of the disc substrate, wherein magnetization is implemented to the magnetic layer formed on the one surface of the disc substrate in a state where the magnetization directions of the magnetic layer portions of the bottom surfaces and that of the magnetic layer portions of the upper surfaces of the information pit trains are different from each other so that data are recorded, and magnetization is implemented to that magnetic layer in a state where the magnetization directions of the magnetic layer portions of the bottom surfaces and that of the magnetic layer portions of the upper surfaces of the control uneven pit trains are different from each other so that control signals are recorded.

Further, in an embodiment, at the magnetic disc used in this invention, there is provided a hub mechanism including a pair of holding members attached to the disc substrate in a manner to hold or put there between the peripheral edge of a center hole provided at the central portion of the disc substrate and a clamping member of metal attached to these holding members and clamped with respect to the disc rotational operation mechanism, wherein the pair of holding members of this hub mechanism are formed by synthetic resin having substantially the same coefficient of thermal expansion as that of the disc substrate.

In an embodiment, a disc cartridge loaded with respect to the magnetic disc apparatus according to this invention comprises a cartridge body within which there is rotatably accommodated either one of (1) a first magnetic disc adapted so that flat recording tracks are provided on at least one surface of a disc substrate formed by molding synthetic resin and a magnetic layer is provided in a manner to cover the recording tracks, the first magnetic disc being adapted so that recording and/or reproduction are carried out by a magnetic head unit comprising a magnetic head element provided on a slider caused to experience a floating force caused by air flow produced as the result of the fact that the magnetic disc is rotated, and (2) a second magnetic disc adapted so that there is provided a disc substrate formed by molding synthetic resin and adapted so that "information" uneven pit trains in which information are recorded and "control" uneven pit trains in which control signals for controlling position of the magnetic head unit are recorded, are formed on at least one surface of the disc substrate, and a magnetic layer formed in a manner to include the bottom surfaces and upper surfaces of the "information" uneven pit trains and the "control" uneven pit trains, the magnetic layer being magnetized such that the magnetization directions of the magnetic layer portions of the bottom surfaces and that of the magnetic layer portions of upper surfaces of the information pit trains are different from each other so that data are recorded, the magnetic layer further being magnetized such that the magnetization directions of the magnetic layer portions of the bottom surfaces and that of the magnetic layer portions of the upper surfaces of the control uneven pit trains are different from each other so that control signals are recorded, the second magnetic disc being adapted so that recording and/or reproduction are carried out by a magnetic head unit comprising a magnetic head element provided at a slider adapted to experience a floating force by air flow produced as the result of the fact that the magnetic disc is rotated; an opening portion for insertion of the magnetic head unit provided at one side surface of the cartridge body; a cover body for opening/closing this opening portion; and a central opening portion for allowing at least the central portion of the magnetic disc to face toward the exterior.

In an embodiment, the opening portion provided at the cartridge body is opened or closed by a cover body provided at the front of the insertion direction side into the magnetic disc apparatus of the cartridge body, and rotatably supported with respect to the cartridge body so that it can be rotated in a direction parallel to a plane surface of the cartridge body and biased by a biasing member in a direction to close the opening portion. At this cover body, there is an engagement portion engaged with a cover body opening member provided at the magnetic disc apparatus side when the disc cartridge is inserted into the magnetic disc apparatus.

Still further different objects of this invention and more practical merits obtained by this invention will become more apparent from the description of the embodiments which will be explained below.

BRIEF DESCRIPTION OF THE DRAWINGS

FIGS. 3(A) and 3(B) are plan views showing a second magnetic disc used in the magnetic disc apparatus according to this invention.

FIG. 4 is a plan view showing, in an enlarged manner, a processing information recording area and a control signal recording area of the second magnetic disc.

DETAILED DESCRIPTION OF THE PRESENTLY PREFERRED EMBODIMENTS

Figure 1A:
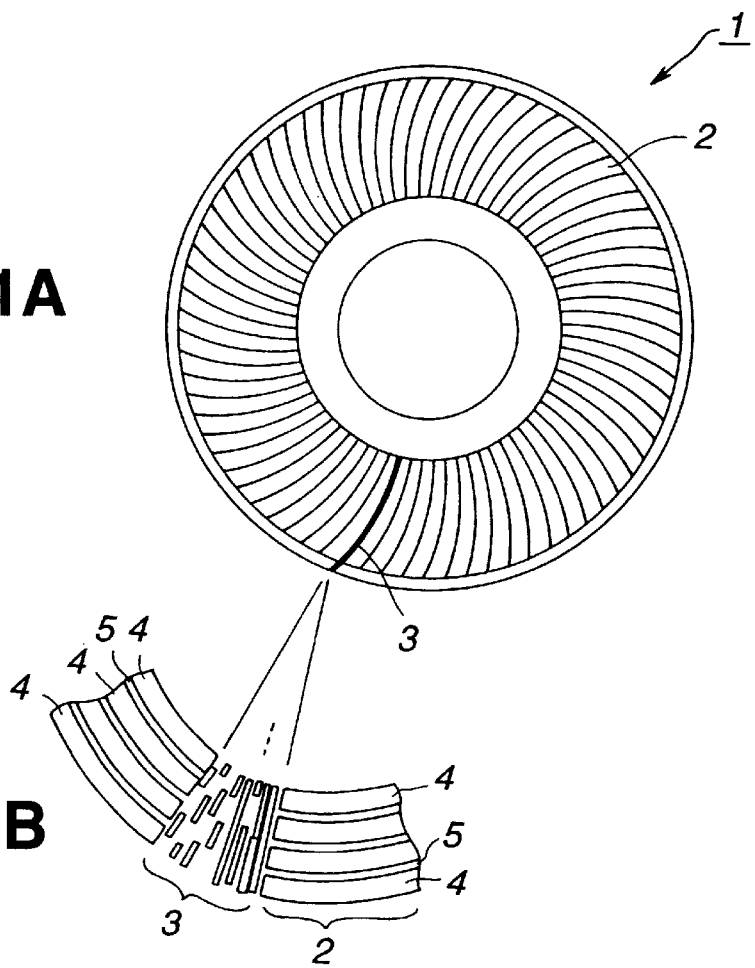
FIGS. 1(A) and 1(B) are plan views showing a first magnetic disc used in a magnetic disc apparatus according to this invention.

A magnetic disc apparatus and a disc cartridge within which a magnetic disc is accommodated, which is loaded with respect to such magnetic disc apparatus, according to this invention will be described below.

The magnetic disc apparatus according to this invention serves to reproduce information or control signals recorded on the magnetic disc, or to record processing information processed by a computer by using a magnetic head device which undergoes floating force by air flow produced as the result of the fact that the magnetic disc is rotated.

The magnetic disc used in this magnetic disc apparatus will now be described.

With respect to the magnetic disc apparatus according to this invention, a first magnetic disc 1 records processing information processed by an information processing unit such as a computer, etc. and a second magnetic disc 15 records program information that the computer executes in advance are selectively loaded. These first and second magnetic discs 1, 15 have a diameter that is approximately 65 mm and thickness that is approximately 1.2 mm.

The first magnetic disc 1 onto which processing information can be recorded will now be described. The first magnetic disc 1 comprises a disc substrate, which takes disc shape, formed by molding synthetic resin such as non-magnetic polyolefine system resin, etc. by an injection molding unit. At least one of the surfaces provides processing information recording areas 2 for recording processing information processed by an information processing unit such as a computer, etc. and control signal recording areas 3 for recording control signals for controlling a position with respect to the first magnetic disc 1 of the magnetic head unit which scans the recording area of the first magnetic disc 1.

On the surface where the processing information recording areas 2 and the control signal recording areas 3 are provided of the disc substrate, there are formed magnetic layers magnetized in accordance with processing information and control signals to be recorded.

Figure 2:
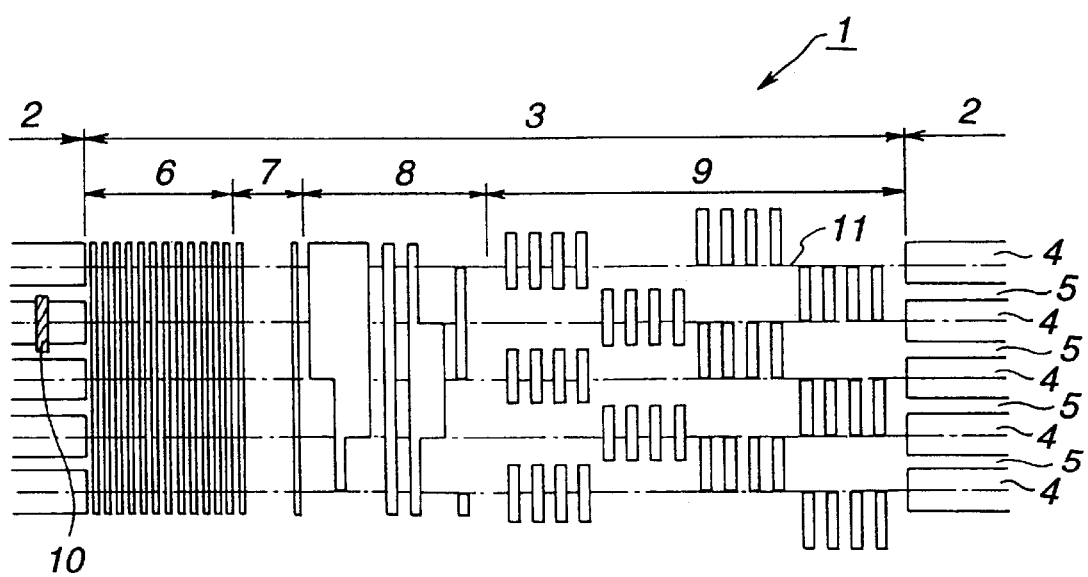
FIG. 2 is a plan view showing, in an enlarged manner, a processing information recording area and a control signal recording area of the first magnetic disc.

Further, concentric or spiral projected line portions in which the upper surface is caused to be a flat surface are formed within the processing information recording area 2. These projected line portions are recording tracks 4 where processing information is recorded as shown in FIG. 2. At both sides of each projected line portion, there are recessed line portions along the projected line portions. These recessed line portions are used as guard band portions 5 for preventing crosstalk of processing information recorded at recording tracks 4 adjacent to each other.

In addition, within the control signal recording area 3, there are formed uneven pit trains for control where there are recorded control signals for controlling positions of the magnetic head unit so that the magnetic head element of the magnetic head unit which scans the signal recording area of the first magnetic disc 1 precisely scans the recording tracks 4.

Figure 1B:
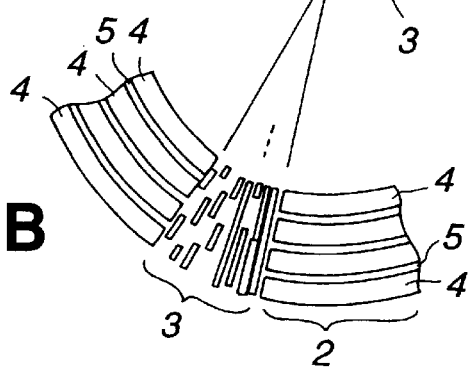

In a more practical sense, as shown in FIG. 1, the first magnetic disc 1 is adapted so that its one circumference is partitioned into 60 sectors. Each sector consists of 14 segments and one circumference is caused to be 840 segments. In addition, each segment consists of the processing information recording area 2 and the control signal recording area 3.

Further, at the leading portion of the recording tracks 4 provided in the processing information recording area 2, there is an ID recording area where track numbers and sector numbers are recorded. The ID recording area identifies the processing information recorded at the recording tracks 4. In addition, processing information recorded at the recording tracks are recorded into the information recording area including the ID recording area.

Further, within the control signal recording area 3 of the first magnetic disc 1, there is a burst portion 6 as shown in FIG. 2. The burst portion 6 includes uneven pit trains where there are recorded burst signals used for auto gain control, etc. for controlling the output of recording or the reproduction of signals from recorded and/or reproduced processing information. A clock mark portion 7 includes uneven pit trains serving as a recording reference or a reproduction of processing information. A track address portion 8 comprised of uneven pit trains used in the case where scanning position of the magnetic head element 10 is determined when the magnetic head unit carries out seek operation, and a fine pattern portion 9 comprised of uneven pit trains for carrying out positioning so that the magnetic head element 10 scans the predetermined recording tracks 4.

Namely, the clock mark 7 is an uneven pit train for a generating clock serving as a recording reference or reproducing processing information, and the clock is obtained in correspondence with reproduction signal obtained when the magnetic head element 10 scans this clock mark 7. This clock mark 7 is radially formed in the radial direction of the magnetic disc 1.

For the track address portion 8, gray codes are used. In more practical sense, at the first magnetic disc 1, the direction of magnetization is inverted in correspondence with 1 bit of gray code to record the track address onto the recording track 4. Namely the reason why a gray code is used as the track address is as follows. Different bit of codes recorded at adjacent recording tracks 4, i.e., codes adjacent to each other is only 1 bit. Even in the case where the magnetic head element 10 traverses two recording tracks 4, value reproduced from the magnetic head element 10 indicates either one of addresses of these two recording tracks. Accordingly, employment of gray code is convenient in the seek operation of the magnetic head device.

The fine pattern portion 9 is disposed in a manner shifted toward the inner circumferential side and the outer circumferential side with central portion 11 between the recording tracks 4 being put therebetween, and is formed in a manner spaced by a predetermined distance also in the track direction. Thus, the magnetic head element 10 is operative so that when it reproduces the fine pattern portion 9, it outputs position pulses in correspondence with respective corresponding edges. Further, the tracking control levels these position pulses so that they are equal to each other. The magnetic head element 10 is controlled so that it is positioned on the center lines 11 between the respective recording tracks 4.

The first magnetic disc 1 is operative so that when it reproduces processing information recorded at the recording track 4, the first magnetic disc 1 experiences tracking control so that the magnetic head element 10 is positioned on the center line 11 of the recording track 4 with the fine pattern portion 9 being as a reference. Further, the first magnetic disc 1 experiences tracking control, at the time of recording the processing information, on the basis of tracking an error signal obtained when the magnetic head element 10 reproduces the fine pattern portion 9, thus permitting the magnetic head element 10 to scan along the respective center lines 11 of the recording tracks 4. Since the first magnetic disc 1 is formed so as to record sector numbers or track numbers in advance, it is possible to securely reproduce sector numbers or track numbers irrespective of the positioning state of the magnetic head element 10.

In this example, control signal of the magnetic head unit recorded in advance in the control signal recording area 3 is recorded by magnetizing the magnetic layer which covers the uneven pit trains provided in the control signal recording area 3 so that the magnetization direction of the magnetic layer portions on the upper surfaces of the uneven pit train and magnetization direction of the magnetic layer portion on the bottom surfaces thereof are different from each other.

The reproduction only type second magnetic disc 15 on which information such as program information, etc. that the computer executes are recorded in advance will now be described.

This second magnetic disc 15 also comprises, a disc substrate which takes disc shape similar to that of the first magnetic disc 1. This second magnetic disc 15 is formed by molding a synthetic resin such as non-magnetic polyolefine system resin, etc. by an injection molding unit. At least one surface of this disc substrate, as shown in FIG. 3, provides program information recording areas 16 where program information that the computer executes and/or processing information processed by the computer are recorded in advance, and the control signal recording areas 17 where control signals for controlling positions with respect to the second magnetic disc 15 of the magnetic head unit which scans the recording area of the second magnetic disc 15 are recorded.

Further, on the surface where the program information recording areas 16 and the control signal recording areas 16 are provided of the disc substrate, there are formed magnetic layers magnetized in accordance with the program information and the control signals which have been recorded.

Further, within each program information recording area 16, there are information recording tracks 18 that have information uneven pit trains where program information is recorded in advance. At both sides of the information recording tracks 18 comprised of uneven pit trains, recessed line portions are formed along the recording tracks 18. These recessed line portions are used as guard band portions 19 for preventing crosstalk of information such as program information, etc. recorded at recording tracks 18 adjacent to each other.

Further, within the control signal recording area 17, there are formed uneven pit trains for control where there are recorded control signals for controlling positions of the magnetic head unit so that the magnetic head element 10 of the magnetic head unit which scans the signal recording area of the second magnetic disc 15 precisely scans the information recording tracks 18.

In a more practical sense, the second magnetic disc 15 is adapted as shown in FIGS. 3A and 3B so that its one circumference is partitioned into 60 sectors. Each sector consists of 14 segments and one circumference is caused to be 840 segments. In addition, each segment consists of a program information recording area 16 and a control signal recording area 17.

Further, at the leading portion of the recording tracks 18 that are in the program information recording area 16, there is an ID recording area where tracks numbers and sector numbers for identifying information such as program information, etc. recorded at these recording tracks 18 are recorded. In addition, information such as program information, etc. recorded at the recording tracks is recorded in the information recording area 16 succeeding to the ID recording area.

Further, within the control signal recording area 17 of the second magnetic disc 15, there is a burst portion 6, as shown in FIG. 4. The burst portion 6 is similar to the control signal recording area 3 provided in the previously described first magnetic disc 1. The burst portion 6 includes uneven pit trains where there are recorded burst signals used in auto gain control, etc. for controlling the output of a recording or reproduction signal in carrying out recording and/or reproduction of processing information. The clock mark portion 7 includes uneven pit trains serving as a reference of recording or reproduction of processing information. The track address portion 8 includes uneven pit trains used for determining a scanning position of the magnetic head element 10 when the magnetic head unit carries out a seek operation, and a fine pattern portion 9 includes uneven pit trains for carrying out positioning so that the magnetic head element 10 scans the respective predetermined recording tracks 18.

When information such as program information, recorded at the recording track 18 is reproduced, the second magnetic disc 15 implements its tracking control so that the magnetic head element 10 is positioned on the center line 11 between the recording tracks 18 with the fine pattern portion 9 as a reference. Since the second magnetic disc 15 is formed in a manner to record sector numbers or track numbers in advance as stated above, it is possible to securely reproduce sector numbers or track numbers irrespective of the positioning state of the magnetic head element 10.

Information, such as program information recorded in advance in the program information recording area 16 of the second magnetic disc 15 and control signals of the magnetic head unit recorded in advance in the control signal recording area 17, are recorded by magnetizing the magnetic layers. The magnetic layers cover uneven pit trains formed in the program information recording areas 16 and the control signal recording areas 17 so that the magnetization direction of the magnetic layer portions on the upper surfaces and that of the magnetic layer portions on the bottom surfaces of the uneven pit train are different from each other.

Meanwhile, step differences of uneven portions between projected line portions constituting the recording tracks 4 formed in the processing information recording areas 2 of the first magnetic disc 1; control uneven pit trains where control signals are recorded in advance, formed in the control signal recording area 3 of the first magnetic disc 1; information uneven pit trains where information such as program information, etc. are recorded in advance, formed in the program information recording area 16 of the second magnetic disc 15; and control uneven pit trains where control signals are recorded in advance, formed in the control signal recording area 17 of the second magnetic disc 15, i.e., heights of the convex portion are formed so that they are substantially equal to each other.

This is because when the first and second magnetic discs 1, 15 are selectively loaded with respect to a common magnetic disc unit for the rotational operation thereof, substantially the same floating forces can be produced with respect to the slider to which the magnetic head element is attached at the magnetic disc unit side.

By forming the first and second magnetic discs 1, 15 so that a substantially constant floating force can be produced with respect to the slider to which the magnetic head element is attached, even in the case where any one of the magnetic discs 1, 15 is loaded with respect to one magnetic disc unit, the distance between the magnetic head element and the signal recording surface of the first or second magnetic disc 1 or 15 becomes constant, thus making it possible to obtain a reproduced output of the same level. In this example, heights of the projections of the first and second magnetic discs 1, 15 are caused to be approximately 200 nm.

The second magnetic disc 15 of the reproduction only type on which there is recorded in advance information such as program information that a computer executes used in the magnetic disc unit according to this invention may be adapted so that the other surface side thereof is an information recording surface which permits recording of information such as processing information processed by information processing equipment such as a computer similar to the previously described first magnetic disc. By providing an information recording surface on the other surface, it is possible to further record information such as program information recorded on the other recording medium such as optical disc. Thus, there are many applications for the magnetic disc.

The first and second magnetic discs 1, 15 using the disc substrate formed by molding synthetic resin in a manner as described above are manufactured as follows.

Figure 5:
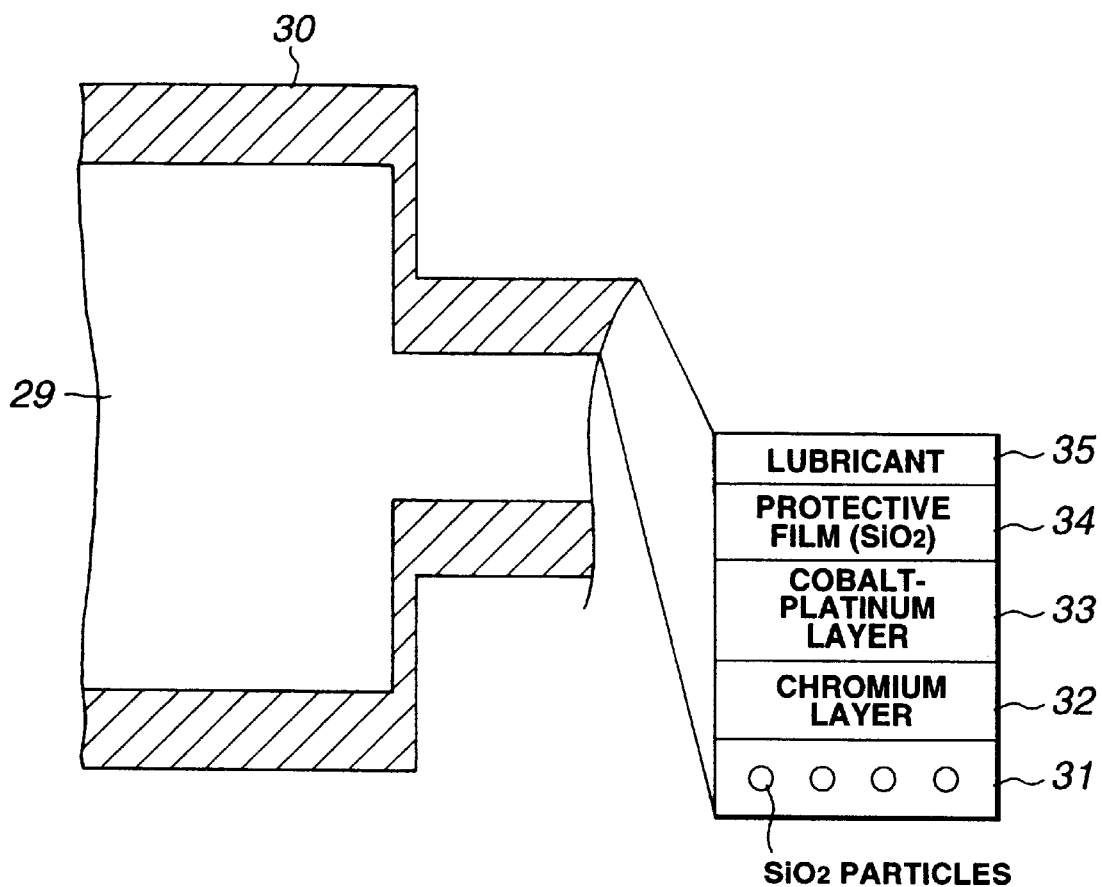
FIG. 5 is a cross sectional view showing, in an enlarged manner, a disc substrate and a magnetic layer of each of the first and second magnetic discs.
Figure 6:
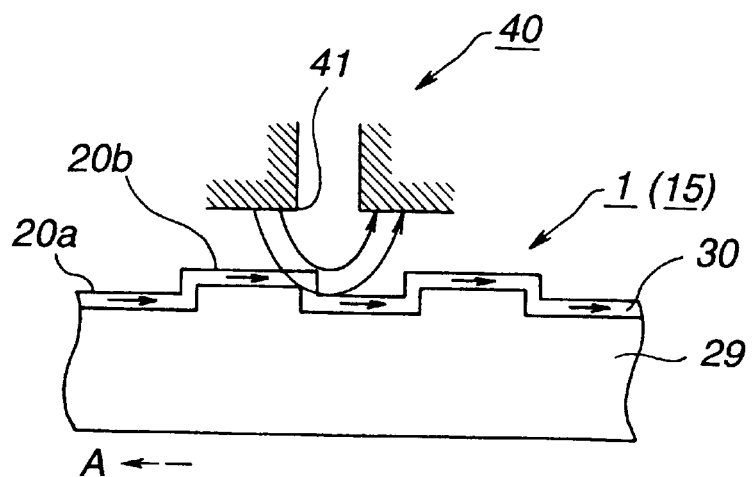
FIGS. 6 and 7 are cross sectional views showing how magnetization is implemented in the first and second magnetic discs.

Initially, in order to form the first or second magnetic disc 1 or 15, a disc substrate 29 constituting the disc 1 or 15 is formed. In FIGS. 5 and 6, the disc substrate 29 is formed by injection-molding a synthetic resin such as non-magnetic polycarbonate resin, polyolefine system resin. At least one of the fixed metal mold and the movable metal mold constitutes a cavity of the metal mold unit forms this disc substrate 29. A stamper in which there is formed uneven patterns corresponding to projected line portions, recessed line portions and uneven pit trains formed at the disc substrate 29 is attached. By injecting the synthetic resin into the cavity of the metal mold unit to which this stamper is attached, the disc substrate 29, to which the projected line portions, the recessed line portions and/or the uneven pit trains corresponding to the uneven patterns provided at the stamper are transferred, is molded.

At the central portion of the molded disc substrate 29, a center hole adapted so that a hub mechanism 58 is attached thereinto is provided in a manner as described later. This center hole is formed by punching the injection-molded disc substrate by a punch provided at the metal mold unit side in releasing that disc substrate from the metal mold unit.

On the disc substrate 29 formed by using the metal mold unit, magnetic layers 30 are then formed. In order to form each magnetic layer 30, as shown in FIG. 5, a particle layer 31 in which particles (spherical silica) consisting of $SiO_2$ have particle density of 0.5 to 100, preferably about 10 per 1 m is formed on the surface of the disc substrate 29. By forming this particle layer 31, rigidity of the disc substrate 29 formed by a synthetic resin is enhanced. In addition, the surface of the disc substrate 29 becomes smooth as a result of the fact that the particle layer 31 is provided.

Further, as shown in FIG. 5, a chromium layer 32 having thickness of about 80 nm is formed on the upper layer of the particle layer 31. This chromium layer 32 functions as exchange coupling film and advantageously improves the magnetic characteristic. Particularly, the chromium layer 32 can enhance a coercive force. Further, a cobalt-platinum layer 33 which is a magnetic body having a thickness of about 40 nm is formed on the upper layer of this chromium layer 32. Further, a protective layer 34 having thickness of about 10 nm is formed on the upper layer of this cobalt-platinum layer 33. This protective layer 34, e.g., $SiO_2$, is formed by a spin coat or coating process. In addition, lubricant 35 is coated on the upper layer of this protective film 34.

Magnetization is implemented to the magnetic layer 30 provided on the disc substrate 29 thus constituted in a manner as described above. Thus, information such as program information, and control signals are recorded.

Figure 7:
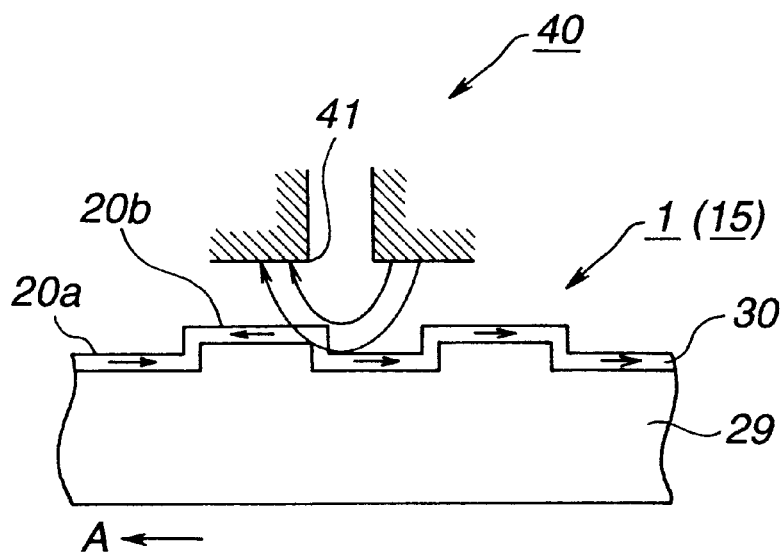

In order to magnetize the magnetic layer 30, as shown in FIG. 6, the disc substrate 29 incorporating the magnetic layer 30 is loaded with respect to a magnetizing unit 40 to rotate this disc substrate 29 in a direction indicated by arrow A in FIG. 6. Further, a first d.c. current is applied to a magnetic head 41 for magnetization while moving the magnetic head 41 for magnetization of the magnetizer 40 in the radial direction of the disc substrate 29 to magnetize the magnetic layer 30 which covers uneven pit trains formed at the disc substrate 29. At this time, the magnetic layer portions of bottom surfaces 20a and those of upper surfaces 20b of the uneven pit train are magnetized in the same direction. Then, a second d.c. current having current value which is small as compared to the first d.c. current is applied, in the state having polarity opposite to the first d.c. current, to the magnetic head 41 for magnetization while rotating the disc substrate 29 in the direction indicated by arrow A in FIG. 7, and while moving the magnetic head 41 for magnetization in the radial direction of the disc substrate 29 to magnetize the magnetic layer 30 portions of the upper surfaces 20b of the uneven pit train of the disc substrate 29. Namely, as a result of the fact that the magnetic layer 30 is magnetized so that the magnetization direction of the magnetic layer portions of the bottom surfaces 20a and that of the magnetic layer portions of the upper surfaces 20b of the uneven pit train are different from each other, information such as program information, etc. and/or control signals are recorded onto the magnetic layer 30.

As stated above, information such as program information, etc. and/or control signals can be recorded by using single magnetic head 41. These information/signals can be recorded by magnetizing the magnetic layer so that magnetization direction of the magnetic layer portions on the bottom surfaces 20a and that of the magnetic layer portions of the upper surfaces 20b of the uneven pit train are different from each other. Accordingly, those information/signals can be easily recorded without exchanging the magnetic head 41 for magnetization. Particularly, since a large capacity of information such as program information, etc. can be recorded at a stroke by using a single magnetic head 41 for magnetization, it becomes extremely easy to manufacture a large number of the reproduction only type second magnetic discs 15 on which information such as program information, etc. are recorded in advance.

The first or second magnetic disc 1 or 15 described above is a disc cartridge accommodated within the cartridge body, and is loaded with respect to the magnetic disc unit within the cartridge body.

A first disc cartridge 50 within which the first magnetic disc 1 is accommodated and a second disc cartridge 51 within which the second magnetic disc 15 is accommodated will now be described.

These first and second disc cartridges 50, 51 are different only in the type of magnetic discs to be accommodated, but are generally similar in configuration.

Figure 8:
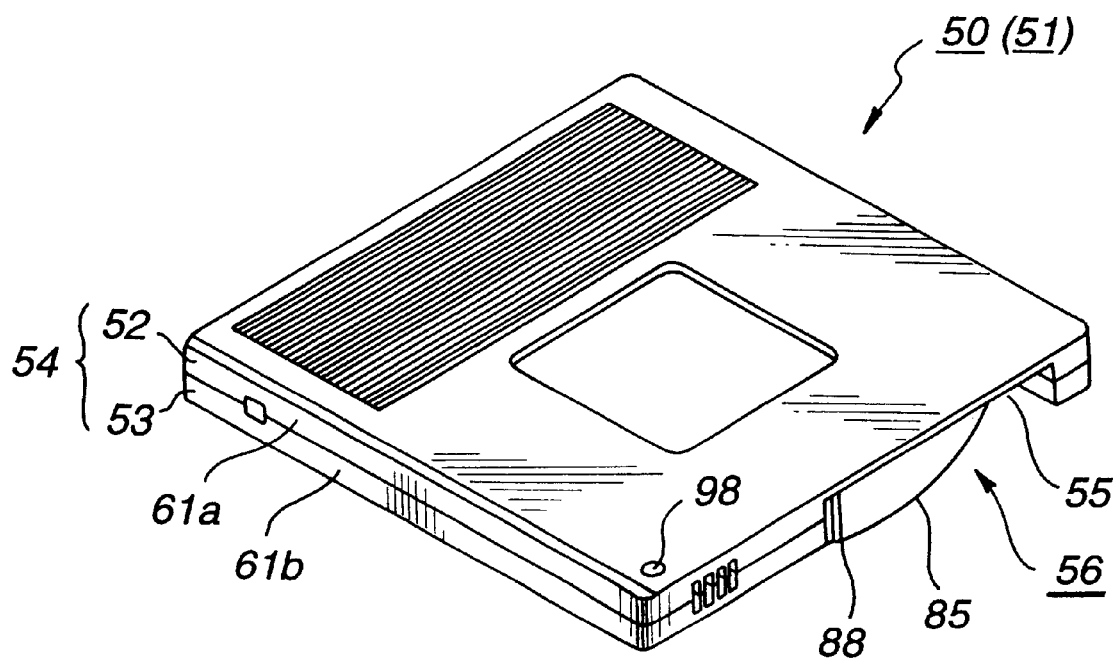
FIG. 8 is a perspective view showing a disc cartridge within which the first or second magnetic disc is accommodated.
Figure 9:
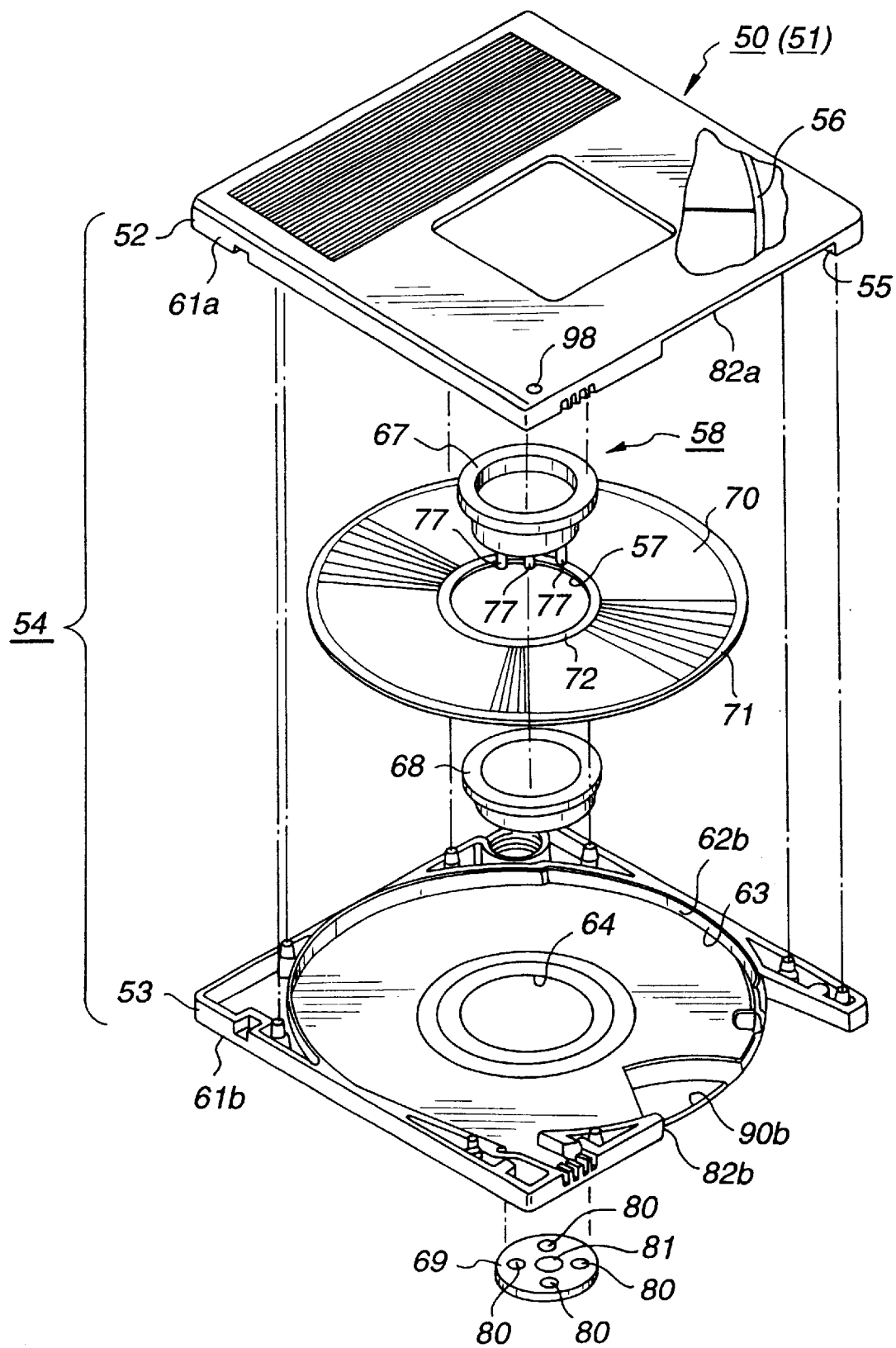
FIG. 9 is an exploded perspective view of the disc cartridge of FIG. 8.

As shown in FIGS. 8 and 9, each of the first and second disc cartridges 50, 51 includes a cartridge body 54 formed by butt-joining a pair of upper and lower rectangular halves 52, 53. The disc cartridges 50, 51 are adapted to rotatably accommodate the first magnetic disc 1 or the second magnetic disc 15 within this cartridge body 54. At one side surface of the cartridge body 54, there is provided a head insertion opening portion 55 into which the magnetic head unit provided at the magnetic disc unit is admitted. This opening portion 55 is opened or closed by a cover body 56 rotatably attached at the cartridge body 54.

The first and the second magnetic discs 1, 15 are accommodated within the first and the second disc cartridges 50, 51 respectively. A hub mechanism 58 for clamping each of the first and second magnetic discs 1, 15 to the disc rotational operation mechanism provided at the magnetic disc unit side is positioned within the disc cartridges.

A pair of upper and lower halves 52, 53 constituting the cartridge body 54 are formed by molding a synthetic resin like ABS resin having satisfactory moldability and sufficient mechanical strength. At the periphery of these upper and lower halves 52, 53, there are rising circumferential (or peripheral) walls 61a, 61b. These rising peripheral walls 61a, 61b are butted to each other so that the upper half 52 and the lower half 53 are combined to constitute the outer circumferential wall 61a, 61b of the cartridge body 54.

Moreover, within the upper and lower halves 52, 53 there are vertically provided disc accommodating walls 62a, 62b in circular arc form which constitute a disc accommodating portion 63 in a manner inscribed to the respective rising circumferential walls 61a, 61b. These disc accommodating walls 62a, 62b are adjoined to each other when the upper half 52 and the lower half 53 are combined to constitute the disc accommodating portion 63. This disc accommodating portion 63 serves to limit the position of the first or second magnetic disc 1 or 15 therewithin and to ensure space for allowing the magnetic head unit to be admitted thereinto.

Moreover, at the central portion of the lower half 53, as shown in FIG. 9, there is formed a disc table admission opening portion 64 into which disc table constituting the disc rotational operation mechanism of the magnetic disc unit is admitted. Further, the hub mechanism 58 attached to the first or second magnetic disc 1 or 15 is positioned at the disc table admission opening portion 64.

The hub mechanism 58 attached to the first or second magnetic disc 1 or 15 attached in such a manner so as to hold the peripheral edge of the center hole 57 formed at the disc substrate 29 therebetween from upper and lower directions. This hub mechanism 58 is composed of a pair of upper and lower hubs 67 and 68 formed from a synthetic resin material and serving as a holding member for holding the disc substrate 29 therebetween from upper and lower directions, and a metallic clamping member 69 attached to the lower hub 68.

In this example, the first or second magnetic disc 1 or 15 to which the hub mechanism 58 is attached is adapted so that an outer circumferential side non-signal recording area 71 is provided at the outer circumferential side of a recording area 70 where processing information recording area 2 or program recording area 16 and control signal recording areas 3 or 17 are formed. An inner circumferential side non-signal recording area 72 is provided at the inner circumferential side of the recording area 70 and in the area surrounding the peripheral edge of the center hole 57.

Figure 10:
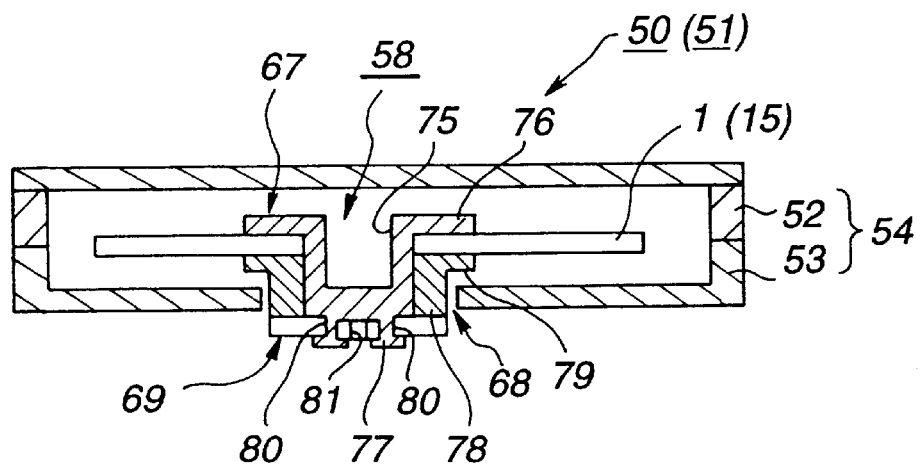
FIG. 10 is a longitudinal cross sectional view of the disc cartridge of FIG. 8.

As shown in FIGS. 9 and 10, the upper hub 67 constituting the hub mechanism 58 is formed so as to have a height slightly greater than each thickness of the first and the second magnetic discs 1, 15. The upper hub 67 is composed of a cylindrical first fitting portion 75 having a bottom fitted into the center hole 57 of the disc substrate 29, a first flange portion 76 provided in a projected manner at the periphery of the bottom end portion side of the first fitting portion 75, and a holding portion 77 projected at the front end surface of the first fitting portion 76. The first fitting portion 75 has an outer diameter substantially equal to the inner diameter of the center hole 57 in such a manner that it is tightly fitted into the center hole 57 of the disc substrate 29. The first flange portion 76 is formed so as to have a diameter slightly smaller than the inner circumferential side non-signal recording area 72 at the peripheral edge of the center hole 57. As shown in FIG. 10, the upper hub 67 is attached to the disc substrate 29 so that the first fitting portion 75 is fitted into the center hole 57 and the first flange portion 76 is held in the inner circumferential side non-signal recording area 72.

Moreover, the lower hub 68 is composed of a second cylindrical fitting portion 78, which is fitted into the first fitting portion 75 of the upper hub 67, and a second flange portion 79 projected at the periphery of the base end portion side of the second fitting portion 78. A height of the second fitting portion 78 corresponds to a quantity projected from the other surface of the disc substrate 29 when the first fitting portion 75 is attached from one surface side of the disc substrate 29. The second flange portion 79 is formed so as to have a diameter slightly smaller than the inner circumferential side non-signal recording area 72 at the peripheral edge of the center hole 57. The lower hub 68 is attached into the first fitting portion 75 and is in contact with the inner circumferential side non-signal recording area 72 of the other surface side of the disc substrate 29.

At the front end surface side of the second fitting portion 78 of the lower hub 68, there are projected holding portions 77 formed at the bottom surface of the first fitting portion 75 of the upper hub 67 side. Further, a clamping member 69 formed by a thin metallic plate is attached to the holding portions 77. Plural engagement holes 80 provided in correspondence with the holding portions 77 are bored at this clamping member 69. Moreover, at the clamping member 69, a spindle hole 81 is bored at the central portion thereof. A spindle constituting the disc rotational operation mechanism is engaged into this spindle hole 81. Further, as shown in FIG. 10, with respect to the upper hub 67 and the lower hub 68, the clamping member 69 is fixed to the disc substrate 29 by using ultrasonic welding or an adhesive agent to hold the holding portions 77 at the engagement hole 80.

Meanwhile, the upper hub 67 and the lower hub 68 of the hub mechanism 58 are formed by a synthetic resin having substantially the same coefficient of thermal expansion as that of the disc substrate 29 of each of the first and second magnetic discs 1, 15. Namely, the upper hub 67 and the lower hub 68 are formed by a synthetic resin such as a polycarbonate resin or a polyolefine system resin, similar to that of the disc substrate 29. In a preferred embodiment, the disc substrate 29 and the upper and lower hubs 67, 68 are formed by using the same synthetic resin. Further, in more practical sense, the disc substrate 29 and the upper and lower hubs 67, 68 are formed by a synthetic resin having a coefficient of thermal expansion of 6.5 to $7.5 \times 10^{-5}$ deg$^{-1}$.

By forming the upper hub 67 and the lower hub 68, the thermal deformation of the first and second magnetic discs 1, 15 due to difference of thermal expansion with respect to the disc substrate 29 can be suppressed. Thus, improving the recording/reproduction characteristic.

Figure 11:
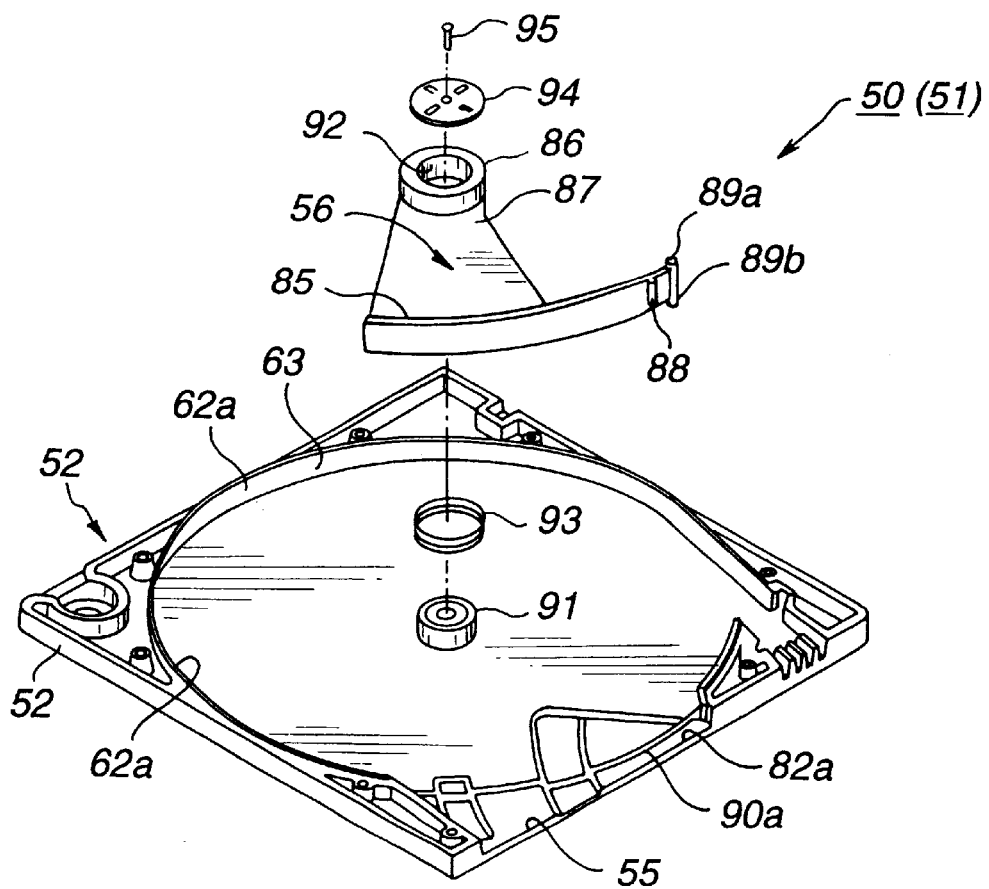
FIG. 11 is an exploded perspective view showing a cover body provided for the disc cartridge and an upper half to which this cover body is attached.

Moreover, at the cartridge body 54, as shown in FIGS. 8 and 9, an opening portion 55 for inserting the head into which the magnetic head unit constituting the recording/reproduction means at the magnetic disc unit side is admitted is provided at the side surface of the insertion direction side into the magnetic disc unit. This head insertion opening portion 55 forms cut portions 82a, 82b at respective portions of the rising circumferential walls 61a, 61b that are formed at the periphery of the upper and lower halves 52, 53. At the head insertion opening portion 55, as shown in FIGS. 8 and 11, there is attached a cover body 56 which is opened only in the case where the first or second disc cartridge 50 or 51 is caused to undergo insertion/withdrawal with respect to the magnetic disc unit. This cover body 56 comprises a shutter portion 85 for closing the head insertion opening portion 55, a supporting portion 86 rotatably supported at the upper half 52, and an arm portion 87 which connects the shutter portion 85 and the supporting portion 86. The shutter portion 85 has a semicircular shape substantially corresponding to the outer shape of each of the first and second magnetic discs 1, 15 as a whole, and is formed so that its height is substantially equal to the thickness of the cartridge body 54. At one end of this shutter portion 85, as shown in FIG. 11, there is a projected portion 88 projecting outward perpendicular to the shutter portion. At the shutter portion 85, guide shafts 89a, 89b are provided in upper and lower directions of the end portion where the projected portion 88 is provided. These guide shafts 89a, 89b are engaged with guide recessed portions 90a, 90b formed at the inner surface side of the upper and lower halve, 52, 53. The supporting portion 86 is adapted so that a fitting hole 92 fitted with respect to a cylindrical supporting portion 91 provided in the central area of the upper half 52 is provided at the center thereof. The shutter portion 85 and the supporting portion 86 are connected by a fan-shaped arm portion 87 extended along the radial direction of each of the magnetic discs 1, 15.

The cover body 56 is rotatably supported with the supported portion 91 as a center such that the supporting portion 91 of the upper half 52 is fitted into the fitting hole 92. The torsion coil spring 93 is fitted with respect to the outer periphery of the supporting portion 91. This torsion coil spring 93 is held between the supporting portion 92 and a portion of the cover body 56 to rotationally bias the cover body 56 in a direction to close the head insertion opening portion 55 with the supporting portion 91 being as center. In this example, the cover body 56 is supported in the state pressed onto the internal surface of the upper half 52 by a set screw 95 fixed to the upper half 52 through a metallic plate 94. On the other hand, the guide shafts 89 of the shutter portion 85 are engaged with a guide recessed portion 90 formed in the vicinity of recessed portions 82a, 82b of the upper and lower halves. Further, the cover body 56 is adapted so that when the first or second disc cartridge 50 or 51 is loaded into the magnetic disc unit, the projected portion 88 experiences a pressing operation by the cover body releasing mechanism provided at the unit side, whereby the cover body 56 is rotated against a biasing force of the torsion coil spring 93 to open the head insertion opening portion 55.

Moreover, at the upper half 52, at the corner portion of the front side thereof, exists a discrimination hole 98 indicating kind or specification of the magnetic disc to be accommodated. This discrimination hole 98 indicates whether the corresponding disc cartridge is either a first disc cartridge 50 within which first magnetic disc 1 which can record information such as processing information of computer, etc. or a second disc cartridge 51 within which second magnetic disc 15 of the reproduction only type on which information such as program information, etc. are recorded in advance.

Figure 12:
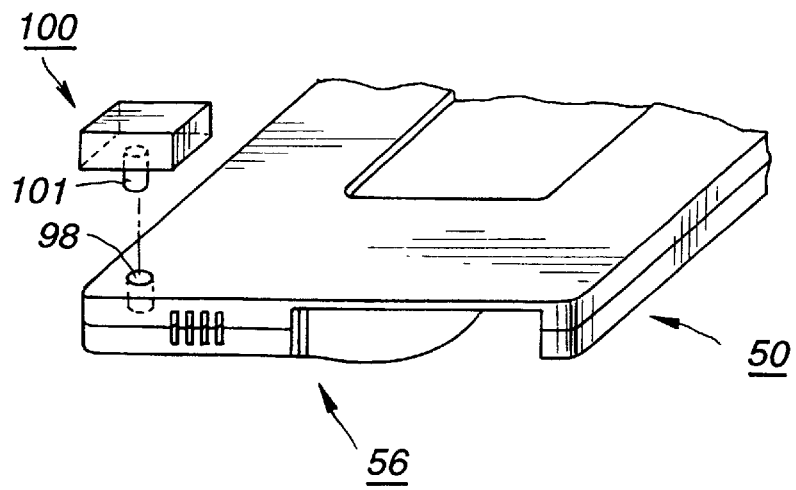
FIG. 12 is a perspective view showing a discrimination portion provided for the disc cartridge and a specification information discrimination mechanism for detecting this discrimination portion.

This discrimination hole 98 is opened in the case of, e.g., the first disc cartridge 50 within which the first magnetic disc 1 permits recording of information, and is closed in the case of the second disc cartridge 51 within which the reproduction only type second magnetic disc 15. Thus, a selection process is implemented between the first and second disc cartridges 50, 51. Selection between the first disc cartridge 50 and the second disc cartridge 51 is carried out by a specification information selecting mechanism 100 provided at the magnetic disc unit as shown in FIG. 12. In this specification information selecting mechanism 100, a detection switch 99 is provided at a position corresponding to the discrimination hole 98 when the first or second disc cartridge 50 or 51, and adapted to be fitted into the discrimination hole 98 provided at the first or second disc cartridge 50 or 51 is loaded with respect to the cartridge loading portion of the magnetic disc unit. Further, selection between the first disc cartridge 50 and the second disc cartridge 51 is dependent upon whether or not the detection switch 99 of the specification information selecting mechanism 100 is admitted into the discrimination hole 98.

Figure 13:
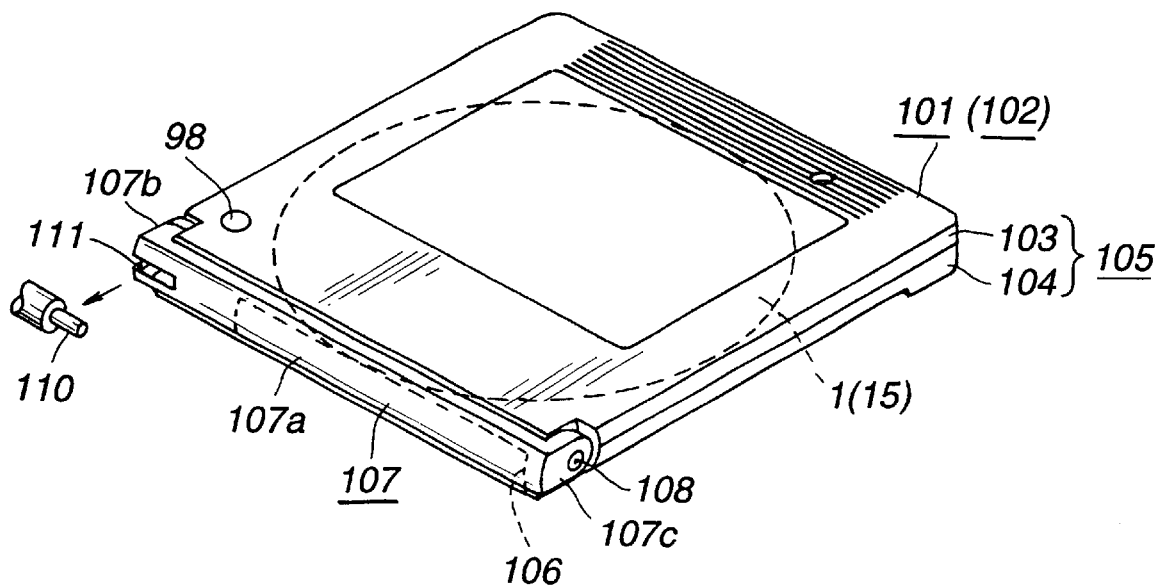
FIG. 13 is a perspective view showing another example of a disc cartridge within which the first or second magnetic disc is accommodated.
Figure 14:
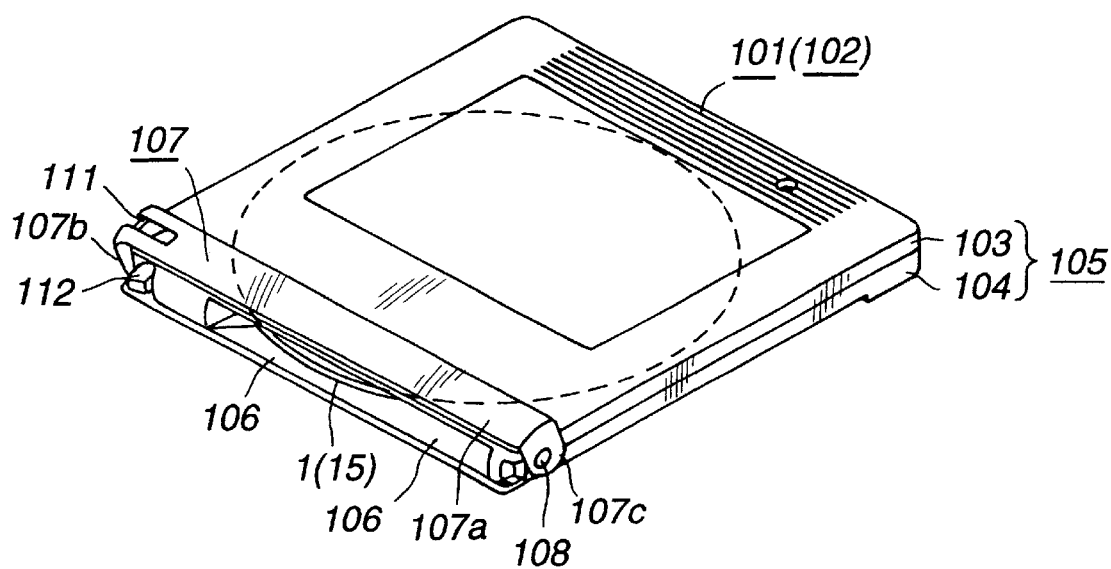
FIG. 14 is a perspective view showing the head insertion opening portion provided at cartridge body of the disc cartridge in an opened state.
Figure 15:
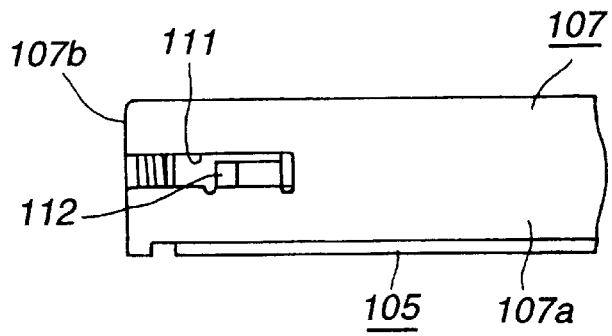
FIG. 15 is a partial front view of the disc cartridge showing same in a state where the head insertion opening portion is closed by the cover body.

The first and the second disc cartridges 101, 102 within which the above-described first and second magnetic discs 1, 15 are used in the magnetic disc apparatus is shown in FIGS. 13 and 14.

Each of the first and second disc cartridges 101, 102 shown in FIGS. 13 and 14 includes a cartridge body 105 formed by butt-joining a pair of upper and lower rectangular halves 103, 104. The disc cartridges 101, 102 are adapted to rotatably accommodate the first magnetic disc 1 or the second magnetic disc 15 within the cartridge body 105. At one side surface of the insertion side with respect to the magnetic disc unit of the cartridge body 105, there is a head insertion opening portion 106 into which the magnetic head unit of the magnetic disc unit is admitted. This opening portion 106 is closed by a cover body 107 rotatably attached in a direction perpendicular to the plane surface of the cartridge body 105.

The cover body 107 for opening/closing this head insertion opening portion 106 includes a front panel 107a for closing the head insertion opening portion 106, and a pair of attachment pieces 107b, 107c projected in a direction perpendicular to the front plate 107a on both sides of this front plate 107a. This cover body 107 is rotatably attached at the cartridge body 105 with support shafts 108. The support shafts 108 are projected on faces opposite to each other of the attachment pieces 107b, 107c as a center by inserting the support shafts 108 through or into pivotal holes 109 at side surfaces perpendicular to one side surface where the head insertion opening portion 106 is formed of the cartridge body 105 so that they are supported. The support shafts 108 are rotatably attached with respect to the cartridge body 105 with the support shafts 108, 108 being as the center. Further, the cover body 107 is rotationally operated with the support shafts 108 as the center to thereby open or close the head insertion opening portion 106. The cover body 107 is rotationally biased in a direction to close the head insertion opening portion 106 by a spring member disposed within the cartridge body 105 (not shown).

Figure 16:
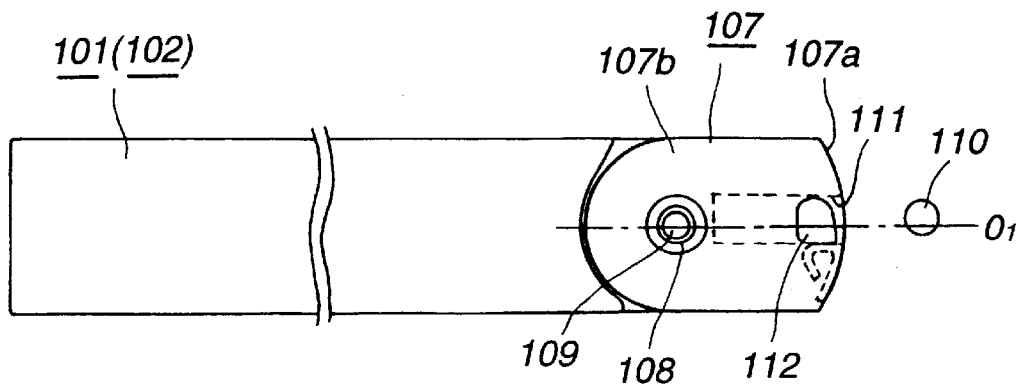
FIG. 16 is a side view of the disc cartridge showing same in a state where the head insertion opening portion is closed by the cover body.

Further, at the cover body 107, as shown in FIGS, 13, 14 and 15, there is formed an opening/closing pin engagement portion 111 formed by cutting the portion extending from the front plate 107a toward one attachment piece 107b, the engagement portion 111 being adapted so that opening/closing pin 110 constituting the opening/closing mechanism of the cover body provided at the magnetic disc unit side is engaged therewith. As shown in FIG. 16, this opening/closing pin engagement portion 111 is formed at a position deviating or shifted toward the side where the cover body 107 is rotated in a direction to open the head insertion opening portion 106 relative to the rotation center position $O_1$ with the support shafts 108 as the center.

In addition, the cover body 107 is adapted so that when it is located at the position where the head insertion opening portion 106 is closed, the lock member 112 disposed within the cartridge body 105 is engaged with the opening/closing pin engagement portion 111. The cover body 107 is locked at the position where the head insertion opening portion 106 is closed. The lock member 112 is adapted so that when the first or second disc cartridge 101 or 102 is loaded with respect to the magnetic disc unit, it is rotationally operated by the opening/closing pin 110 engaged with the opening/closing engagement portion 111. The cover body 107 is released so that the cover body 107 can be rotated with the support shafts 108 as the center.

In this example, also in the first or second disc cartridge 101 or 102 shown in FIG. 13, the discrimination hole 98 indicates the type or specification of the magnetic disc for the cartridge body 105.

Figure 17:
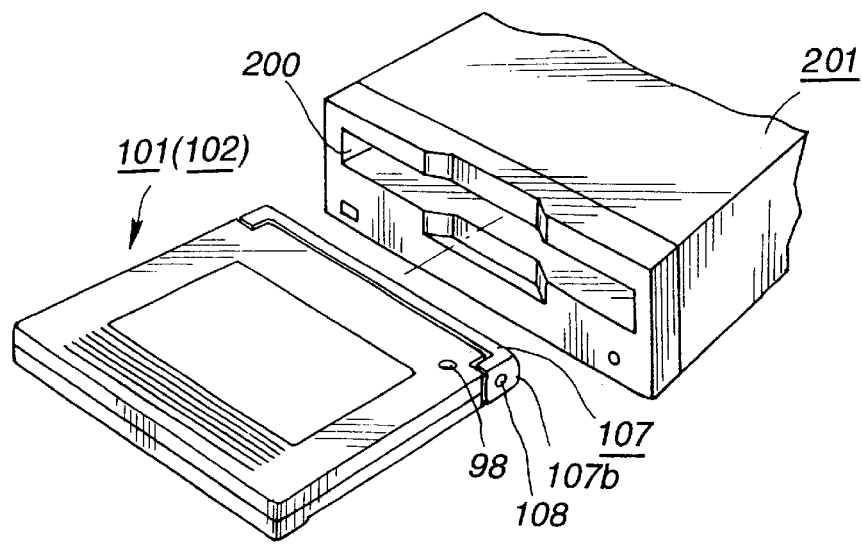
FIG. 17 is a perspective view showing a magnetic disc apparatus according to this invention.

In FIG. 17, a magnetic disc apparatus 201 according to this invention will now be described. This magnetic disc unit 201 is designed so that the first or second disc cartridge 101 or 102 as shown in FIGS. 13 and 14 may be loaded therewithin.

As shown in FIG. 17, a the magnetic disc unit 201 according to this invention comprises a casing 202 constituting the unit body. Within this casing 202, there is disposed a recording/reproduction section 203 in which the first or second disc cartridge 101 or 102 is loaded to carry out recording/reproduction of processing information with respect to the first magnetic disc 1 within the first or second disc cartridge 101 or 102, to reproduce program information recorded on the second magnetic disc 15.

Further, at the front side of the casing 202, there is an insertion/withdrawal hole 200 for the insertion/withdrawal of the first or second disc cartridge 101 or 102 loaded with respect to the magnetic disc unit 201.

Figure 18:
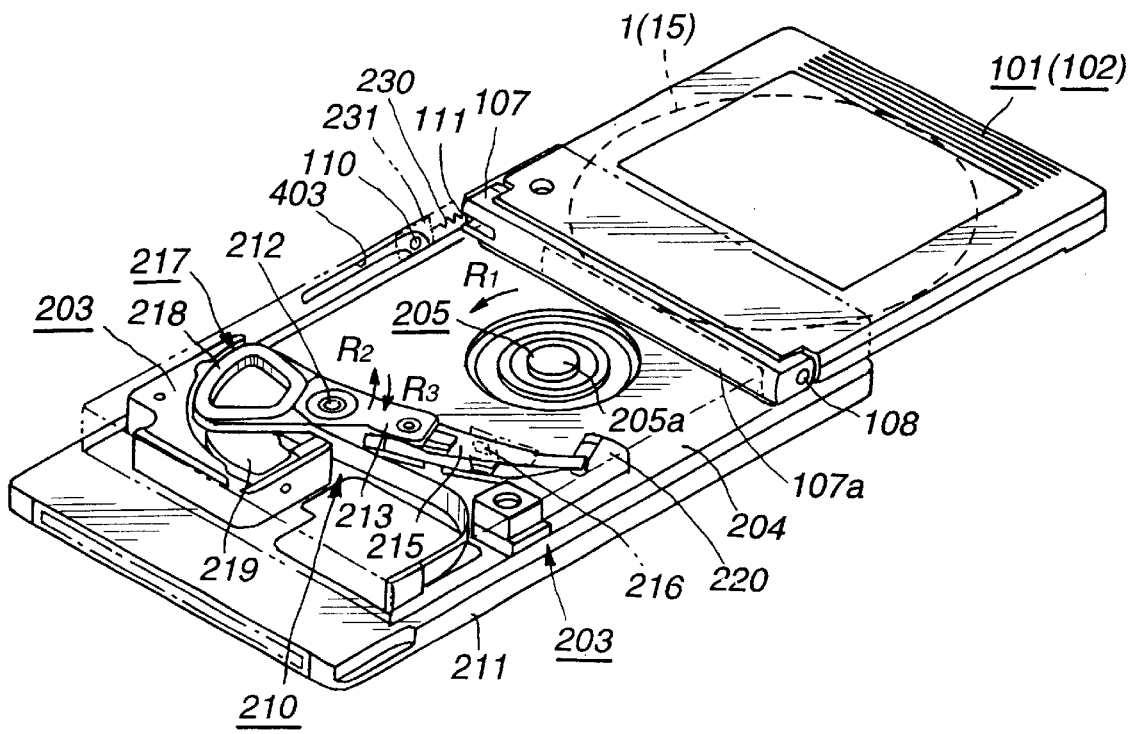
FIG. 18 is a perspective view showing a recording/reproduction unit of the magnetic disc apparatus according to this invention.

As shown in FIG. 18, the recording/reproduction section 203 disposed within the casing 202 comprises a base 211 comprised of metallic plate consisting of aluminum alloy, etc. At the upper surface side in FIG. 18 of this base 211, there is a cartridge loading portion 204 adapted so that the first or second disc cartridge 101 or 102 inserted into the casing 202 through the insertion/withdrawal hole 200 is loaded after it has undergone positioning. Further, at the central portion of the base 211, there is disposed a disc rotational operation mechanism 205 for allowing the first or second magnetic disc 1 or 15 accommodated within the first or second disc cartridge 101 or 102 loaded with respect to the cartridge loading portion 204 to undergo rotational operation. This disc rotational operation mechanism 205 is composed of a disc table 205a on which the first or second magnetic disc 1, 15 is integrally clamped through the hub mechanism 58, and a spindle motor for allowing the disc table 205a to rotate. The disc table 205a is rotated in the direction indicated by arrow $R_1$ in FIG. 18 at constant angular velocity by the spindle motor.

Moreover, on the base 211, there is disposed a magnetic head unit 210 for carrying out recording and/or reproduction of information with respect to the first or second magnetic disc 1, 15 caused to undergo rotational operation in the state clamped by the disc rotational operation mechanism 205. This magnetic head unit 210 comprises a rotational arm 213 for supporting a head slider 216 adapted so that magnetic head element 10 is integrally attached at the front end side thereof, and a voice coil motor 217 for allowing the rotational arm 213 to rotate.

The rotational arm 213 is rotated so that a middle portion thereof is supported by a support shaft 212 vertically provided on the base 211, in the direction indicated by arrow $R_2$ and in the direction indicated by arrow $R_3$ in FIG. 18 with the support shaft 212 as the center. Further, the head slider 216 is attached through a leaf spring 215 connected to the front end side of the rotational arm 213. This leaf spring 215 is formed to experience elastic displacement in a direction that comes into contact with the signal recording surface of the first or second magnetic disc 1 or 15 clamped by the disc rotational operation mechanism 205 or moves in a direction away therefrom.

The voice coil motor 217 is composed of a drive coil 218 attached at the base end portion side of the rotational arm 213, and a magnet 219 disposed on the base 211 in a manner opposite to this drive coil 18. This voice coil motor 217 rotates the rotational arm 213, with the support shaft 212 as the center, in the direction indicated by arrow $R_2$ and in the direction indicated by arrow $R_3$ in FIG. 18 by action between drive current delivered to the drive coil 218 and magnetic field of the magnet 219. When the rotational arm 213 rotates, the head slider 216 attached to the front side of this rotational arm 213 moves along the inner and outer circumferences of the first or second magnetic disc 1 or 15. The magnetic head element 10 that is attached to this head slider 216 scans the signal recording area of the first or second magnetic disc 1 or 15 to record processing information with respect to the first magnetic disc 1, or to read-out the program information recorded on the second magnetic disc.

In this example, the magnetic head unit 210 is adapted so that when it is located at the initial position where it does not record and/or reproduce information with respect to the first or second magnetic disc 1 or 15, the front end side of the leaf spring 215 which has supported the head slider 216 is supported on the supporting portion 220 provided on the base 211. The leaf spring 215 support limits inadvertent displacement. Thus the head slider 216 and the magnetic head element 10 attached to the head slider 216 are prevented from coming into contact with foreign matter and possibly being damaged.

Figure 19:
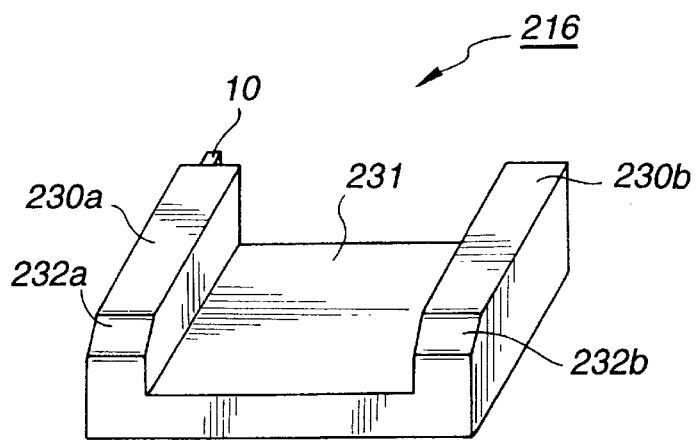
FIG. 19 is a perspective view showing a slider of magnetic head unit of the magnetic disc apparatus.

Meanwhile, at the head slider 216, as shown in FIG. 19, a pair of side rails 230a, 230b which form air bearing are formed between the head slider 216 and the first or second magnetic disc 1 or 15 on both sides of the lower surface side opposite to the first or second magnetic disc 1 or 15 to form a recessed portion 231 between these side rails 230a, 230b. These side rails 230a, 230b are adapted so that when the head slider 216 is opposed to the surface of the first or second magnetic disc 1 or 15, they are substantially in parallel to the recording tracks 4 or 18 at the first or second magnetic disc 1 or 15. At the air inlet end side opposite to the rotational direction of the first or second magnetic disc 1 or 15 of the side rails 230a, 230b, there are taper portions 232a, 232b. In addition, the magnetic head element 10 is at the end portion of air outlet side opposite to the air inlet side of the head slider 216.

Figure 20:
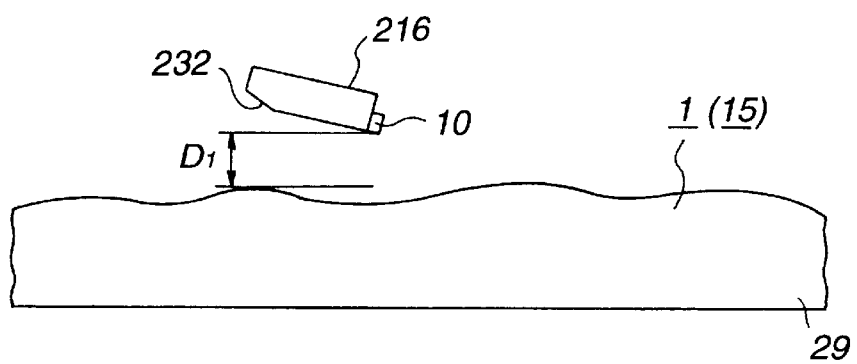
FIG. 20 is a side view showing the head slider, to which magnetic head element is attached, experiencing a floating force.

When the head slider 116 is close to the surface of the first or second magnetic disc 1 or 15 that experiences the rotational operation as shown in FIG. 20, the head slider 116 experiences a floating force produced by an air flow that flows into the portion between side rails 230a, 230b and the surface of the first or second magnetic disc 1 or 15 followed by the rotation of the first or second magnetic disc 1 or 15 so that it floats from the surface of the first or second magnetic disc 1 or 15. When the head slider 216 floats from the surface of the first or second magnetic disc 1 or 15, the magnetic head element 10 attached to this head slider 216 also floats from the surface of the first or second magnetic disc 1 or 15 as shown in FIG. 20, and it moves along the inner and the outer circumferences on the first or second magnetic disc 1 or 15 with a floating quantity of very small distance $D_1$, e.g., about 0.1 m being held between the magnetic head element 10 and the first or second magnetic disc 1 or 15. As a result of the head slider 216 and the magnetic head element 10 move on the first or second magnetic disc 1 or 15 in the state floating from the first or second magnetic disc 1 or 15, abrasion and/or damage of the first and second magnetic discs 1, 15 and the magnetic head element 10 can be prevented.

When the floating head slider 216 is used, even in the case where there are slight uneven portions at the surface of the first or second magnetic disc 1 or 15 as shown in FIG. 20, the head slider absorbs the influence of these uneven portions, thereby maintaining a substantially constant floating quantity from the first or second magnetic disc 1 or 15 of the head slider 216 and the magnetic head element 10 during recording and/or reproduction. Thus, recording and/or reproduction of information can be carried out with a fixed recording and/or reproduction characteristic.

The operation for loading the first or second disc cartridge 101 or 102 with respect to the magnetic disc unit 201 will now be described.

In order to allow the first or second disc cartridge 101 or 102 to experience loading with respect to the magnetic disc unit 201, the first or second disc cartridge 101 or 102 is inserted into the casing 202 through the insertion/withdrawal hole 200 with one side surface (where the cover body 107 is provided) as an insertion end as shown in FIG. 17.

Figure 21:
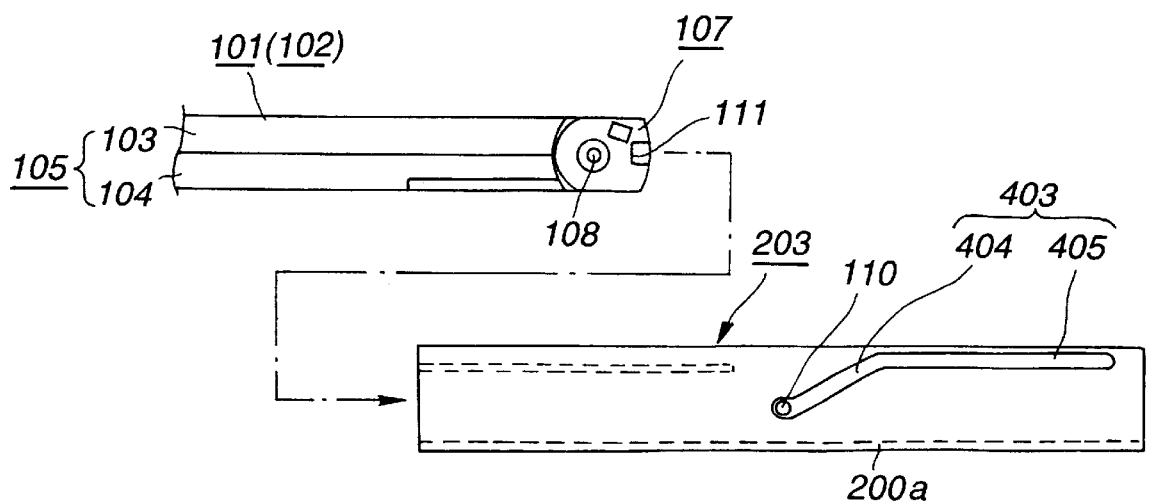
FIG. 21 is a side view showing a first or second disc cartridge loaded with respect to the magnetic disc apparatus.

When the first or second disc cartridge 101 or 102 is inserted into the casing 202, the opening/closing pin 110 constituting the opening/closing mechanism disposed at the magnetic disc unit 201 side is engaged with the opening/closing pin engagement portion 111 provided at the cover body 107 as shown in FIG. 21. At this time, the lock member 112 experiences a pressing operation by the opening/closing pin 110. Thus, engagement with respect to the cover body 107 of the lock member 112 is released, resulting the cover body 107 can be rotated with the support shaft 108 at the center.

As shown in FIG. 18, the opening/closing pin 110 is movably supported along one side surface 200a of the casing 202 and is attached through a movement lever 231 that provides movement biasing toward the insertion/withdrawal hole 200 side in the direction indicated by an arrow $X_1$, in FIG. 18 by a tension spring 230.

Figure 22:
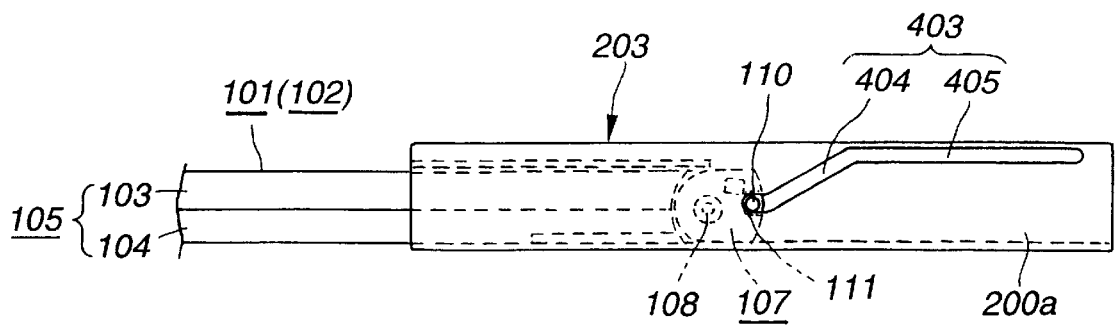
FIG. 22 is a side view showing the first or second disc cartridge inserted into the magnetic disc apparatus.
Figure 23:
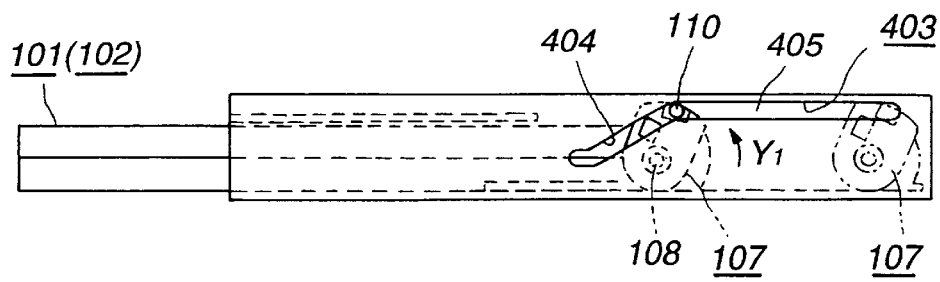
FIG. 23 is a side view showing the first or second disc cartridge inserted into the magnetic disc apparatus so that head insertion opening portion is opened.
Figure 24:
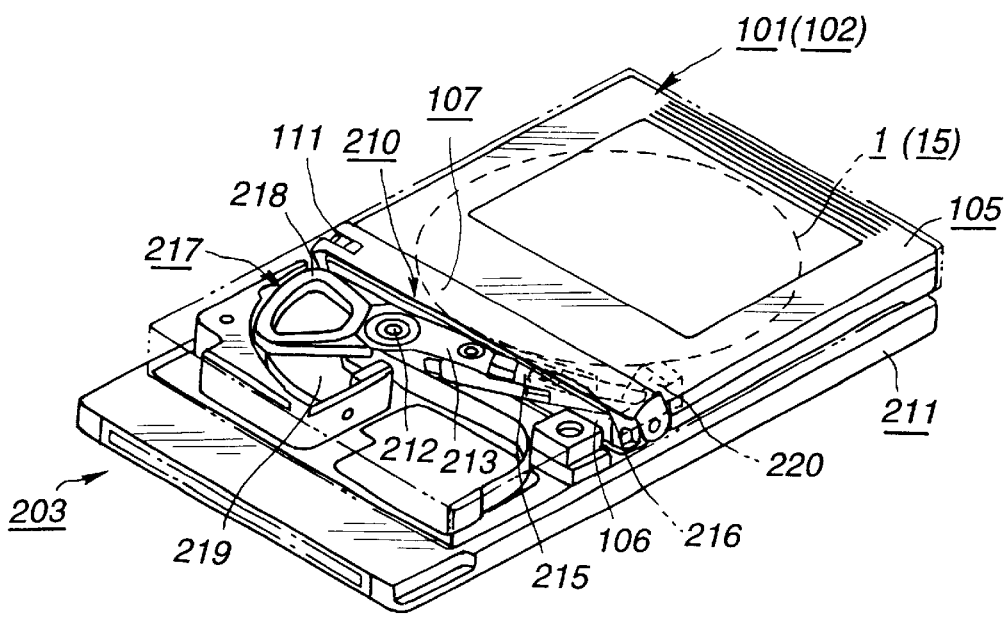
FIG. 24 is a perspective view showing the first or second disc cartridge loaded with respect to cartridge loading portion of the recording/reproduction unit.

Further, when the first or second disc cartridge 101 or 102 is inserted into the casing 202 toward the internal side of the casing 202, the opening/closing pin 110 is pushed by the cartridge body 105, and is moved in the direction indicated by an arrow $X_2$ in FIG. 22 against a biasing force of the tension spring 230 while being guided by a movement guide groove 403 formed at one surface 200a of the casing 202. The movement guide groove 403 for guiding the movement direction of the opening/closing pin 110 is composed of an inclined groove portion 404 and a horizontal groove portion 405 as shown in FIGS. 21 and 23.

The opening/closing pin 110 is adapted so that in the initial state where it is pushed by the first or second disc cartridge 101, 102 inserted into the casing 202, it is moved in a rising direction while being guided by the inclined guide groove 404 of the movement guide groove 403. When the opening/closing pin 110 is moved in the rising direction, the cover body 107 is rotated in the direction indicated by an arrow $Y_1$ in FIG. 23 with the support shaft 108 as the center against the biasing force of the spring member to open the head insertion opening portion 106 provided at one side surface of the cartridge body 105.

When the first or second disc cartridge 101 or 102 is further inserted into the casing 202 so that the opening/closing pin 110 is moved up to the upper end portion of the inclined guide groove 404, the head insertion opening portion 106 provided at the cartridge body 105 is fully opened.

Further, when the first or second disc cartridge 101 or 102 is inserted into the casing 202, the opening/closing pin 110 is moved within the horizontal groove portion 405 of the movement guide groove 403. The first or second disc cartridge 101 or 102 is inserted into the casing 202 while the head insertion opening portion 106 remains fully opened, and is loaded with respect to the cartridge loading portion 204 on the base 211 after positioning. At this time, the first or second magnetic disc 1 or 15 accommodated within the cartridge body 105 is clamped by a disc table 205a of the disc rotational operation mechanism 205, resulting in the rotatable state in one body with the disc table 205a. Further, the rotational arm 213 which has supported the head slider 216 of the magnetic head unit 210 through the head insertion opening portion 106 is inserted into the cartridge body 105.

In this example, the movement lever 213 which has supported the opening/closing pin 110 is supported at one side surface 200a of the casing 202 so that the opening/closing pin 110 can be moved along the movement guide groove 403.

Moreover, in the vicinity of the insertion/withdrawal hole 200 within the casing 202, a specification information identification mechanism 100 is provided although not shown. This specification information identification mechanism serves to identify the type of disc cartridge loaded with respect to the magnetic disc unit 201. Thus, the operation mode corresponding to the disc cartridge to be loaded can be selected.

When the first or second disc cartridge 101 or 102 is loaded with respect to the magnetic disc unit 201 by an operation as described above to record and/or reproduce information and thereafter to operate the eject mechanism provided at the magnetic disc unit 201, the loaded first or second disc cartridge 101 or 102 is taken out from the casing 202 through the insertion/withdrawal hole 200. At this time, the cover body 107 provided at the cartridge body 105 undergoes a biasing force of the spring member, whereby it is rotated with the support shaft 108 being as the center so as to close the head insertion opening portion 106, and is locked with respect to the lock member 112 to hold the head insertion opening portion 106 in a closed state.

The first magnetic disc 1 is accommodated within the first disc cartridge 101. Uneven pit trains are formed on the magnetic disc 1 in the control signal recording areas 3 and control signals for controlling the magnetic head unit are recorded therewithin. However, the first magnetic disc 1 may be a disc adapted so that the magnetic layer is only formed on the surface of the disc substrate having a flat surface without recording control signals, etc. in advance.

INDUSTRIAL APPLICABILITY

As described above, in the magnetic disc apparatus using a magnetic disc where recording and/or reproduction are carried out by the magnetic head unit which undergoes a floating force by air flow produced as a result of the rotation of the magnetic disc, the first disc cartridge is selectively loaded and accommodates the first magnetic disc. The first magnetic disc is adapted so that flat recording tracks are provided at the disc substrate formed by molding a synthetic resin and a magnetic layer to cover the recording tracks. In addition, the second disc cartridge is selectively loaded and accommodates the second magnetic disc. The second magnetic disc is adapted so that information uneven pit trains are formed at the disc substrate formed by molding a synthetic resin and a magnetic layer to include the bottom surfaces and the upper surfaces of information uneven pit trains. The magnetic layer is magnetized so that the magnetization direction of the magnetic layer portions of the bottom surfaces and the upper surfaces of the information uneven pit trains are different from each other so that information such as program, etc. for controlling computers are recorded. Accordingly, by exchanging only the disc cartridge, it is possible to install new program information or record processing information processed by the computer.

Particularly, since the magnetic disc apparatus according to this invention is adapted to selectively carry out loading of mass producible magnetic discs on which information such as program information, etc. are recorded in advance to permit implementation of installing new program information with respect to computer, the operating ability of the computer can be improved. In addition, since installing new program information and/or recording processing information processed by computer can be carried out by a single apparatus, information processing equipment such as computer, etc. can become more compact.

What is claimed is:

1. A magnetic disc having at least one surface and adapted so that a magnetic head unit can record and/or reproduce signals on the magnetic disc, the magnetic head unit having a magnetic head element provided at a slider, the magnetic disc effective to have the magnetic head element experience a floating force due to air flow produced as the result of the rotation of the magnetic disc, the magnetic disc comprising:

a disc substrate formed by injection molding a first synthetic resin and adapted so that information uneven pit trains, where information is recorded, and control uneven pit trains where control signals for controlling positions of the magnetic head unit are recorded, are formed on a first surface and a second surface opposite the first surface of the magnetic disc, the information uneven pit trains being formed as information recording tracks with guard band portions of recessed lines along opposite sides of the information recording tracks, each control uneven pit train having a burst portion comprising uneven pit trains for recording a burst signal, a clock mark portion comprising uneven pit trains for a clock, a track address portion for identifying a track address using gray codes, and a fine pattern portion comprising uneven pit trains for carrying out positioning so that the magnetic head unit scans the track, the fine pattern portion having a first portion of uneven pit trains shifted toward an inner circumferential side of the magnetic disc and a second portion of uneven pit trains shifted toward an outer circumferential side of the magnetic disc with a central portion of the fine pattern portion therebetween and aligned with a central portion of the track, the clock mark portions being radially formed in a radial direction of the magnetic disc;

a magnetic layer covering a plurality of bottom and upper surfaces of the information uneven pit trains and the control uneven pit trains, the magnetic layer being magnetized so that a magnetization direction of the magnetic layer portions on the plurality of bottom surfaces and the plurality of upper surfaces of the information uneven pit trains are different from each other so that information is recorded, and the magnetic layer being further magnetized so that magnetization direction of the magnetic layer portions on the plurality of bottom surfaces and that of the plurality of upper surfaces of the control uneven pit trains are different from each other so that the control signals are recorded; and a hub mechanism having an uppers holding member, a lower holding member, and a clamping member, the hub mechanism being attached to the disc substrate so that a peripheral edge of a central portion of the disc substrate is positioned between the pair of holding members, and the clamping member being attached to the holding members and clamped by a disc rotation mechanism, wherein the holding members compromise a second synthetic resin having substantially a same coefficient of thermal expansion as the first synthetic resin of the disc substrate.

2. The magnetic disc as set forth in claim 1, wherein the disc substrate and the pair of holding members are formed by a synthetic resin having a coefficient of thermal expansion between $6.5 \times 10^{-5}$ to $7.5 \times 10^{-5}$ $\deg^{-1}$.

* * * * *